United States Patent
Hefner, Jr.

(10) Patent No.: US 9,255,177 B2
(45) Date of Patent: Feb. 9, 2016

(54) HYBRID EPOXY RESIN ADDUCTS

(75) Inventor: Robert E. Hefner, Jr., Rosharon, TX (US)

(73) Assignee: Blue Cube IP LLC, Midland, MI (US)

( * ) Notice: Subject to any disclaimer, the term of this patent is extended or adjusted under 35 U.S.C. 154(b) by 0 days.

(21) Appl. No.: 14/117,907

(22) PCT Filed: Jun. 14, 2012

(86) PCT No.: PCT/US2012/042342
§ 371 (c)(1),
(2), (4) Date: Nov. 15, 2013

(87) PCT Pub. No.: WO2013/006250
PCT Pub. Date: Jan. 10, 2013

(65) Prior Publication Data
US 2014/0163180 A1    Jun. 12, 2014

Related U.S. Application Data

(60) Provisional application No. 61/503,874, filed on Jul. 1, 2011.

(51) Int. Cl.
*C08G 59/14* (2006.01)
*C08G 59/04* (2006.01)
*C08G 59/18* (2006.01)
*C08G 59/02* (2006.01)
*C08L 63/00* (2006.01)

(52) U.S. Cl.
CPC .......... *C08G 59/1477* (2013.01); *C08G 59/022* (2013.01); *C08G 59/04* (2013.01); *C08G 59/184* (2013.01); *C08L 63/00* (2013.01)

(58) Field of Classification Search
CPC ...................................................... C08G 59/14
USPC .................................. 525/524, 523; 528/407
See application file for complete search history.

(56) References Cited

U.S. PATENT DOCUMENTS

| | | | |
|---|---|---|---|
| 4,125,558 A | 11/1978 | Torsi | |
| 4,284,574 A | 8/1981 | Bagga | |
| 5,128,491 A | 7/1992 | Cheng | |
| 6,410,807 B1 | 6/2002 | Yang et al. | |
| 2011/0039082 A1 | 2/2011 | Yun et al. | |
| 2013/0144015 A1 | 6/2013 | Hefner | |
| 2013/0237642 A1 | 9/2013 | Hefner, Jr. | |

FOREIGN PATENT DOCUMENTS

| | | |
|---|---|---|
| EP | 0121260 A2 | 10/1984 |
| EP | 0702042 A1 | 3/1996 |
| WO | 2009/143038 A1 | 11/2009 |
| WO | 2009142901 A1 | 11/2009 |
| WO | 2012044443 A1 | 4/2012 |

OTHER PUBLICATIONS

Henry Lee and Kris Neville in Handbook of Epoxy Resins published by McGraw Hill, Inc., New York, (1967) on pp. 7-15 to 7-19.
Daniel A. Scola in Developments in Reinforced Plastics 4 published by Elsevier Applied Science Publishers Ltd., England, pp. 196-206 (1984).
J. Klee, et al. in Crosslinked Epoxies published by Walter de Gruyter and Co., Berlin, pp. 47-54 (1987).
Kazunari Taira, William L. Mock and David G. Gorenstein, Experimental Tests of the Stereoelectronic Effect at Phosphorus: Nucleophilic Reactivity of Phosphite Esters, Journal of the American Chemical Society, 106 , 7831-7835 (1984).
Kohei Tamao, Neyoshi Ishida, Yoshihiko Ito, and Makoto Kumada as published in Organic Syntheses, Collective vol. 8 p. 315, Annual vol. 69 p. 96.
John C. Wilson and F. Lynn Hamb in "Polyesters Containing the Norbornane Structure", Journal of Polymer Science: Polymer Chemistry Edition, vol. 10, 3191-3204 (1972).
Hitoshi Nakamura, Toshikazu Takata and Takeshi Endo in "Polyurethanes Containing a New diol Segment. Synthesis of Polyurethanes Containing a Norbornene Moiety and Their Reactions with Thiols", Macromolecules, 23, 3032-3035 (1990).
PCT/US2012/042342, International Search Report dated Jul. 11, 2012.
PCT/US2012/042342, International Preliminary Report on Patentability dated Jan. 16, 2014.
PCT/US2012/042342, Written Opinion of the International Searching Authority.

*Primary Examiner* — Duc Truong

(57) ABSTRACT

A hybrid epoxy resin adduct comprising, consisting of, or consisting essentially of the reaction product of: (A) a material selected from the group consisting of a hybrid polyfunctional aliphatic epoxy resin, a hybrid cycloaliphatic epoxy resin, and combinations thereof; wherein (A) is formed by contacting: (a) a hydroxyl-containing material selected from the group consisting of an aliphatic hydroxyl-containing material, a cycloaliphatic hydroxyl-containing material, and combinations thereof; (b) a material selected from the group consisting of a monoglycidyl ether-containing material, a diglycidyl ether-containing material, and combinations thereof wherein (b) is prepared from a different precursor than (a); (c) an epihalohydrin; (d) a basic acting substance; (e) a non-Lewis acid catalyst; and (f) optionally, a solvent and (B) at least one epoxide reactive compound comprising one or more compounds having two or more epoxide-reactive hydrogen atoms per molecule, is disclosed.

19 Claims, No Drawings

HYBRID EPOXY RESIN ADDUCTS

REFERENCE TO RELATED APPLICATIONS

This application is a non-provisional application claiming priority from the U.S. Provisional Patent Application No. 61/503,874, filed on Jul. 1, 2011, entitled "HYBRID EPOXY RESIN ADDUCTS" the teachings of which are incorporated by reference herein, as if reproduced in full hereinbelow.

BACKGROUND OF THE INVENTION

1. Field of the Invention

The present invention relates to hybrid polyfunctional aliphatic and/or cycloaliphatic epoxy resin adducts and thermoset matrices prepared using such adducts.

2. Description of Background and Related Art

Adducts of the epoxy resin of UNOXOL™ Diol (cis-, trans-1,3- and 1,4-cyclohexanedimethanol) may be used in curing of epoxy resins or preparation of polyurethanes. Generally, an epoxy resin comprising a diglycidyl ether (DGE) of cis-1,3-cyclohexanedimethanol, a DGE of trans-1,3-cyclohexanedimethanol, a DGE of cis-1,4-cyclohexanedimethanol, a DGE of trans-1,4-cyclohexanedimethanol, a monoglycidyl ether (MGE) of cis-1,3-cyclohexanedimethanol, a MGE of trans-1,3-cyclohexanedimethanol, a MGE of cis-1,4-cyclohexanedimethanol, and a MGE of trans-1,4-cyclohexanedimethanol either containing oligomers or free of oligomers thereof are used in the preparation of an epoxy resin adduct.

Thermosettable compositions based on the oligomers [polyfunctional aliphatic cycloaliphatic epoxy (PACE) resin] are inherently co-produced in significant quantity from a fractionation process used to produce high purity DGE. Adducts of the PACE resins may also be prepared and are useful as epoxy resin curing agents.

Hybrid polyfunctional aliphatic cycloaliphatic epoxy (H-PACE) resins and re-epoxidized H-PACE resins comprise an (a) aliphatic and/or cycloaliphatic moiety provided by the PACE resin which additionally contains (b) aliphatic and/or cycloaliphatic moiety that is different from that provided by the PACE resin. Heretofore, the prior art has not disclosed an adduct formed by reacting a H-PACE resin or re-epoxidized H-PACE resin with a reactive compound comprising two or more reactive hydrogen atoms per molecule or curable and cured epoxy resin compositions prepared using said hybrid adduct.

SUMMARY OF THE INVENTION

In an embodiment of the invention, there is disclosed a hybrid epoxy resin adduct comprising, consisting of, or consisting essentially of the reaction product of:
(A) a material selected from the group consisting of a hybrid polyfunctional aliphatic epoxy resin, a hybrid cycloaliphatic epoxy resin, and combinations thereof;
wherein (A) is formed by contacting:
  (a) a hydroxyl-containing material selected from the group consisting of an aliphatic hydroxyl-containing material, a cycloaliphatic hydroxyl-containing material, and combinations thereof;
  (b) a material selected from the group consisting of a monoglycidyl ether-containing material, a diglycidyl ether-containing material, and combinations thereof wherein (b) is prepared from a different precursor than (a);
  (c) an epihalohydrin;
  (d) a basic acting substance;
  (e) a non-Lewis acid catalyst; and
  (f) optionally, a solvent
  and
(B) at least one epoxide reactive compound comprising one or more compounds having two or more epoxide-reactive hydrogen atoms per molecule.

DETAILED DESCRIPTION OF THE INVENTION

The present invention is directed to an epoxy resin adduct which comprises the reaction product of a H-PACE resin and a compound having two or more reactive hydrogen atoms per molecule such that the resulting hybrid adduct may be used as a curing agent with other thermosetting resins such as epoxy resin compounds.

"H-PACE resin" means a hybrid polyfunctional aliphatic and/or cycloaliphatic epoxy resin composition comprising (a) aliphatic and/or cycloaliphatic moiety provided by the PACE resin which additionally contains (b) aliphatic and/or cycloaliphatic moiety that is different from that provided by the PACE resin. The H-PACE resin used in the present invention may include a re-epoxidized H-PACE resin. The H-PACE resin is co-produced during an epoxidation process for producing a hybrid aliphatic or cycloaliphatic epoxy resin product; wherein the co-produced H-PACE resin and the hybrid aliphatic or cycloaliphatic epoxy resin product resultant mixture after the epoxidation process is subjected to a subsequent separation process such that the co-produced H-PACE resin is substantially separated and isolated from the hybrid aliphatic or cycloaliphatic epoxy resin product. The separation process can be carried out by a known means such as for example a distillation unit operation. Once the co-produced H-PACE resin is separated from the hybrid aliphatic or cycloaliphatic epoxy resin product, for example by distillation, the resulting separated/isolated H-PACE resin, typically the residual bottoms material of a distillation process, comprises the H-PACE resin useful as a reactant in the present invention.

One broad embodiment of the present invention is a hybrid adduct comprising the reaction product of (A) at least one H-PACE resin; and (B) at least one reactive compound having two or more epoxide-reactive hydrogen atoms per molecule. The term 'epoxide-reactive' denotes that the hydrogen atoms are reactive with epoxide groups.

The H-PACE resin may be prepared by
(I) reacting a mixture of (a) an aliphatic and/or cycloaliphatic hydroxyl-containing material, (b) a material selected from the group consisting of a monoglycidyl ether-containing material, a diglycidyl ether-containing material, and combinations thereof (hereinafter referred to as a glycidyl ether stream), (c) an epihalohydrin, (d) a basic acting substance, (e) a non-Lewis acid catalyst, and (f) optionally, a solvent, forming an epoxy resin composition, wherein (b) is prepared from a different precursor than (a);
(II) subjecting the hybrid epoxy resin composition produced in step (I) to a separation (fractionation) process to remove (A) "light" components such as, for example, solvent used in the epoxidation reaction, if any, unreacted epihalohydrin, and co-products such as di(epoxypropyl)ether; (B) unreacted aliphatic and/or cycloaliphatic hydroxyl-containing material, if any; (C) partially epoxidized aliphatic and/or cycloaliphatic hydroxyl-containing material(s), such as, for example, MGE(s); (D) fully epoxidized aliphatic and/or cycloaliphatic hydroxyl-containing material(s), such as, for example, DGE(s), such that the (E) H-PACE resin product remaining contains no more than 50% by weight of said fully epoxidized aliphatic and/or cycloaliphatic hydroxyl-containing material (D).

As used herein, the term "adduct" means a product of a direct addition of two or more distinct molecules, resulting in a single reaction product. The resultant reaction product or adduct is considered a distinct molecular species from the reactants used to form the adduct.

Concerning the aliphatic and/or cycloaliphatic glycidyl ether stream used herein, "MGE" means a partially epoxidized aliphatic or cycloaliphatic hydroxyl-containing material while "DGE" denotes a fully epoxidized aliphatic or cycloaliphatic hydroxyl-containing material. When the aliphatic or cycloaliphatic hydroxyl-containing material is a diol, the MGE contains one unreacted hydroxyl group and one glycidyl ether group formed by epoxidation of a hydroxyl group. When the aliphatic or cycloaliphatic hydroxyl-containing material is a diol, the DGE contains two glycidyl ether groups formed by epoxidation of the two hydroxyl groups in the diol precursor. The aliphatic and/or cycloaliphatic glycidyl ether stream is a fraction which is co-produced during an epoxidation process for producing an aliphatic or cycloaliphatic epoxy resin product; wherein the co-produced glycidyl ether fraction and the aliphatic or cycloaliphatic epoxy resin product resultant mixture after the epoxidation process is subjected to a subsequent separation process such that the co-produced glycidyl ether fraction is substantially separated and isolated from the aliphatic or cycloaliphatic epoxy resin product. The separation process can be carried out by a known means such as, for example, a distillation unit operation. Once the co-produced glycidyl ether fraction is separated from the aliphatic or cycloaliphatic epoxy resin product, for example by distillation, the resulting separated/isolated glycidyl ether fraction, typically one or more cuts taken in a distillation process, comprises the glycidyl ether stream useful in the present invention. Thus, the partially epoxidized aliphatic or cycloaliphatic hydroxyl-containing material may contain 100% by weight MGE and 0% by weight DGE, to 100% by weight DGE and 0% by weight MGE. It follows that if the aliphatic or cycloaliphatic hydroxyl-containing material used was a triol, MGE, DGE, triglycidyl ether (TGE) or mixtures of two or more of the individual components may be used in the process of the present invention.

In general, the H-PACE resin component (A) used as a reactant in the present invention is prepared by a process (e.g. an epoxidation reaction) comprising reacting (i) an aliphatic or cycloaliphatic hydroxyl-containing material and (ii) a glycidyl ether-containing material of a different moiety than (i) with (iii) an epihalohydrin, and (iv) a basic acting substance in the presence of (v) a non-Lewis acid catalyst. The process may optionally comprise (vi) one or more solvents which are substantially inert to reaction with the reactants employed, the intermediates formed and the epoxy resin product produced. Said process typically comprises the steps of (1) coupling of the epihalohydrin with the aliphatic or cycloaliphatic hydroxyl-containing material (i) and (2) dehydrohalogenation of the intermediate halohydrin thus formed in the presence of the glycidyl ether-containing material of a different chemical structure than (i). The process may be, for example, a phase transfer catalyzed epoxidation process, a slurry epoxidation process, or an anhydrous epoxidation process.

A detailed description of the H-PACE resin (A) useful in the present invention and the processes for preparing the such resin is provided in co-pending U.S. Patent Application Ser. No. 61/503,867, entitled "HYBRID EPOXY RESINS", filed of even date herewith by Robert Hefner, Jr. (Attorney Docket No. 70880) incorporated herein by reference.

Any aliphatic or cycloaliphatic hydroxyl-containing reactant may be employed in the epoxidation to produce the epoxy resin from which the glycidyl ether is recovered for use as a reactant in another epoxidation using a different aliphatic or cycloaliphatic hydroxyl-containing reactant. Likewise, any aliphatic or cycloaliphatic hydroxyl-containing reactant may be employed in the epoxidation to produce the H-PACE resin, as long as it is different than aliphatic or cycloaliphatic hydroxyl-containing reactant used to produce the glycidyl ether stream. Aliphatic and/or cycloaliphatic hydroxyl-containing materials which may be employed in the present invention may include for example any one or more of the following: (a) cyclohexanedialkanols and cyclohexenedialkanols such as UNOXOL™ Diol (cis-, trans-1,3- and 1,4-cyclohexanedimethanol) as a preferred cyclohexanedialkanol; (b) cyclohexanolmonoalkanols and cyclohexenolmonoalkanols, such as trans-2-(hydroxymethyl)cyclohexanol or 1-phenyl-cis-2-hydroxymethyl-r-1-cyclohexanol; (c) decahydronaphthalenedialkanols, octahydronaphthalenedialkanols and 1,2,3,4-tetrahydronaphthalenedialkanols, such as 1,2-decahydronaphthalenedimethanol; (d) bicyclohexanedialkanols or bicyclohexanolmonoalkanols, such as bicyclohexane-4,4'-dimethanol; (e) bridged cyclohexanols, such as hydrogenated bisphenol A (4,4'-isopropylidenediphenol); (f) other cycloaliphatic and polycycloaliphatic diols, monol monoalkanols, or dialkanols such as, cyclopentane-1,3-diol; or (g) aliphatic hydroxyl-containing materials such as aliphatic diols and alkoxylated phenolic reactants; as described in pages 9 to 15 of co-pending U.S. Patent Application Ser. No. 61/388,059, such pages incorporated herein by reference.

The epichlorohydrin, component (iii); the basic acting substance, component (iv); the non-Lewis acid catalyst, component (v); and the optional solvent, component (vi) useful in the present invention may be selected from the same components as described in co-pending U.S. Patent Application Ser. No. 61/388,059, such pages incorporated herein by reference.

Basic acting substances which may also be employed in the epoxidation process include alkali metal hydroxides, alkaline earth metal hydroxides, carbonates, bicarbonates, and any mixture thereof, and the like. More specific examples of the basic acting substance include sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, magnesium bicarbonate, lithium bicarbonate, calcium bicarbonate, barium bicarbonate, manganese bicarbonate, and any combination thereof. Sodium hydroxide and/or potassium hydroxide are the preferred basic acting substance.

Non-Lewis acid catalysts which may also be employed in the epoxidation process include, for example, ammonium, phosphonium, or sulfonium salts. More specific examples of the catalyst include salts of the following ammonium, phosphonium and sulfonium cations: benzyltributylammonium, benzyltriethylammonium, benzyltrimethylammonium, tetrabutylammonium, tetraoctylammonium, tetramethylammonium, tetrabutylphosphonium, ethyltriphenylphosphonium, triphenylsulfonium, 4-tert-butoxyphenyldiphenylsulfonium, bis(4-tert-butoxyphenyl)phenylsulfonium, tris(4-tert-butoxyphenyl)sulfonium, 3-tert-butoxyphenyldiphenylsulfonium, bis(3-tert-butoxyphenyl)phenylsulfonium, tris(3-tert-butoxyphenyl)sulfonium, 3,4-di-tert-butoxyphenyldiphenylsulfonium, bis(3,4-di-tert-butoxyphenyl)phenylsulfonium, tris(3, 4-di-tert-butoxyphenyl)sulfonium, diphenyl(4-thiophenoxyphenyl)sulfonium, 4-tert-butoxycarbonylmethyloxyphenyl-diphenylsulfonium, tris(4-tert-butoxycarbonylmethyloxyphenyl)sulfonium, (4-tert-butoxyphenyl)bis(4-dimethylaminophenyl)sulfonium, tris (4-dimethyl-aminophenyl)sulfonium, 2-naphthyldiphenylsulfonium, (4-n-hexyloxy-3,5-dimethyl-phenyl)diphenylsulfonium, dimethyl(2-naphthyl)sulfonium, 4-methoxyphenyldimethyl-sulfonium, trimethylsulfonium, 2-oxocyclohexylcyclohexylmethylsulfonium, trinaphthyl-sulfonium, tribenzylsulfonium, diphenylmethylsulfonium, dimethylphenylsulfonium, 2-oxo-2-phenylethylthiacyclo-pentanium, diphenyl-2-thienylsulfonium, 4-n-butoxynaph-thyl-1-thiacyclopentanium, 2-n-butoxynaphthyl-1-thiacy-clopentanium, 4-methoxynaphthyl-1-thiacyclopentanium, and 2-methoxynaphthyl-1-thiacyclopentanium. Preferred cations are triphenylsulfonium, 4-tert-butylphenyldiphenyl-sulfonium, 4-tert-butoxyphenyldiphenylsulfonium, tris(4-tert-butylphenyl)sulfonium, tris(4-tert-butoxyphenyl)sulfo-nium, dimethylphenylsulfonium, and any combination thereof. Suitable quaternary phosphonium catalysts also include, for example, those quaternary phosphonium compounds disclosed in U.S. Pat. Nos. 3,948,855, 3,477,990 and 3,341,580 and Canadian Patent No. 858,648 all of which are incorporated herein by reference. Benzyltriethylammonium halides are the preferred catalyst, with benzyltriethylammonium chloride being most preferred.

The H-PACE resin may be re-epoxidized to produce a novel re-epoxidized H-PACE resin useful in the present invention. Re-epoxidation of PACE resin compositions and the re-epoxidation process for producing said compositions are disclosed in aforementioned co-pending U.S. Patent Application Ser. No. 61/388,064. The re-epoxidation process is conducted to modify the distribution of the components comprising said H-PACE resin. The re-epoxidation process converts hydroxyl groups present in the H-PACE resin to glycidyl ether groups providing increased thermosettable functionality. The re-epoxidation process comprises epoxidation reaction of (I) a H-PACE resin, (II) an epihalohydrin, and (III) a basic-acting substance, in the presence of (IV) a non-Lewis acid catalyst, and (V) optionally, one or more solvents.

One embodiment of the H-PACE resin, useful as component (A) in the present invention, may include the hybrid polyfunctional oligomeric aliphatic/cycloaliphatic epoxy resin isolated from the epoxy resin where the aliphatic and/or cycloaliphatic hydroxyl-containing material (a) being epoxidized is UNOXOL™ Diol (cis-, trans-1,3- and 1,4-cyclohexanedimethanol) and the glycidyl ether-containing material (b) is a mixture of neopentyl glycol MGE and DGE. It is to be understood that the H-PACE resin comprises multiple components, for example as shown in Reference Example 1 of the present invention.

The reactive compound (B) used in the present invention to react with the H-PACE resin to form the hybrid adduct comprises at least one compound having two or more reactive hydrogen atoms per molecule. The reactive hydrogen atoms are reactive with epoxide groups, such as those epoxide groups contained in the H-PACE resin. The term "reactive hydrogen atom" as used herein means that the hydrogen atom is reactive with an epoxide group. The reactive hydrogen atom differs from other hydrogen atoms including those hydrogen atoms which are non-reactive with epoxide groups in the reaction of forming the hybrid adduct but may be reactive with epoxide groups in a later process of curing the hybrid adduct with one or more epoxy resins.

Hydrogen atoms can be non-reactive with the epoxide groups in the process of forming the hybrid adduct but reactive in a later process of curing the hybrid adduct with the epoxy resin, when there are other functional groups, which are much more reactive with the epoxide groups under reaction conditions used, present in the reaction of forming the hybrid adduct. For example, a reactive compound (B) may have two different functional groups each bearing at least one reactive hydrogen atom, with one functional group being inherently more reactive with an epoxide group than the other under the reaction conditions used. These reaction conditions may include the use of a catalyst which favors a reaction of the reactive hydrogen atom(s) of one functional group with an epoxide group over a reaction of the reactive hydrogen atom(s) of the other functional group with an epoxide group.

Non-reactive hydrogen atoms may also include the hydrogen atoms in the secondary hydroxyl groups which form during an epoxide ring opening reaction in the process of producing the hybrid adduct.

The reactive compound (B) comprising at least one compound having two or more reactive hydrogen atoms per molecule may further comprise aliphatic, cycloaliphatic or aromatic groups within the reactive compound (B) structure. The aliphatic groups may be branched or unbranched. The aliphatic or cycloaliphatic groups may also be saturated or unsaturated and may comprise one or more substituents which are inert (not reactive) to the process of preparing the hybrid adduct of the present invention including the reactants and the products. The substituents may be attached to a terminal carbon atom or may be between two carbon atoms, depending on the chemical structures of the substituents. Examples of such inert substituents include halogen atoms, preferably chlorine or bromine, nitrile, nitro, alkyloxy, keto, ether (—O—), thioether (—S—), or tertiary amine. The aromatic ring, if present within the reactive compound (B) structure, may comprise one or more heteroatoms such as N, O, S and the like.

Examples of the reactive compound (B) may include compounds such as (a) di- and polyphenols, (b) di- and polycarboxylic acids, (c) di- and polymercaptans, (d) di- and polyamines, (e) primary monoamines, (f) sulfonamides, (g) aminophenols, (h) aminocarboxylic acids, (i) phenolic hydroxyl containing carboxylic acids, (j) sulfanilamides, and (k) any combination of any two or more of such compounds or the like.

Examples of the di- and polyphenols (a) include 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1'-bis(4-hydroxyphenyl)-1-phenylethane; 3,3', 5,5'-tetrachlorobisphenol A; 3,3'-dimethoxybisphenol A; 3,3',5,5'-tetramethyl-4,4'-dihydroxydiphenyl; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; 1,1-bis(4-hydroxyphenyl) cyclohexane; 1,4-dihydroxy-3,6-dimethylbenzene; 1,4-dihydroxy-3,6-dimethoxybenzene; 1,4-dihydroxy-2-tert-butylbenzene; 1,4-dihydroxy-2-bromo-5-methylbenzene; 1,3-dihydroxy-4-nitrophenol; 1,3-dihydroxy-4-cyanophenol; tris(hydroxyphenyl)methane; dicyclopentadiene or an oligomer thereof and phenol or substituted phenol condensation products; and any mixture thereof.

Examples of the di- and polycarboxylic acids (b) include terephthalic acid, isophthalic acid, dicyclopentadienedicarboxylic acid, tris(carboxyphenyl)methane, 4,4'-dicarboxydiphenylmethane; 1,4-cyclohexanedicarboxylic acid; 1,6-hexanedicarboxylic acid; 1,4-butanedicarboxylic acid; 1,1-bis(4-carboxyphenyl)cyclohexane; 3,3',5,5'-tetramethyl-4,4'-dicarboxydiphenyl; 4,4'-dicarboxy-alpha-methylstilbene; 1,4-bis(4-carboxyphenyl)-trans-cyclohexane; 1,1'-bis(4-carboxyphenyl)cyclohexane; 1,3-dicarboxy-4-methylbenzene; 1,3-dicarboxy-4-methoxybenzene; 1,3-dicarboxy-4-bromobenzene; and any combination thereof.

Examples of the di- and polymercaptans (c) include bis(2-mercaptoethyl)sulfide, tris(mercaptophenyl)methane, 1,3-benzenedithiol; 1,4-benzenedithiol; 4,4'-dimercaptodiphenylmethane; 4,4'-dimercaptodiphenyl oxide; 4,4'-dimercapto-alpha-methylstilbene; 3,3',5,5'-tetramethyl-4,4'-dimercaptodiphenyl; 1,4-cyclohexanedithiol; 1,6-hexanedithiol; 2,2'-dimercaptodiethylether; 1,2-dimercaptopropane; 1,1-bis(4-mercaptophenyl)cyclohexane, and any combination thereof.

Examples of the di- and polyamines (d) include tris(aminophenyl)methane, bis(aminomethyl)norbornane, piperazine, ethylenediamine, diethyletriamine, triethylenetetramine, tetraethylenepentamine, 1-(2-aminoethyl)piperazine, bis(aminopropyl)ether, bis(aminopropyl)sulfide, isophorone diamine, 1,2-diaminobenzene; 1,3-diaminobenzene; 1,4-diaminobenzene; 4,4'-diaminodiphenylmethane; 4,4'-diaminodiphenylsulfone; 2,2'-diaminodiphenylsulfone; 4,4'-diaminodiphenyl oxide; 3,3',5,5'-tetramethyl-4,4'-diaminodiphenyl; 3,3'-dimethyl-4,4'-diaminodiphenyl; 4,4'-diamino-alpha-methylstilbene; 4,4'-diaminobenzanilide; 4,4'-diaminostilbene; 1,4-bis(4-aminophenyl)-trans-cyclohexane; 1,1-bis(4-aminophenyl)cyclohexane; 1,2-cyclohexanediamine; 1,4-bis(aminocyclohexyl)methane; 1,3-bis(aminomethyl)cyclohexane; 1,4-bis(aminomethyl)cyclohexane; 1,4-cyclohexanediamine; 1,6-hexanediamine, 1,3-xylenediamine; 2,2'-bis(4-aminocyclohexyl)propane; 4-(2-aminopropan-2-yl)-1-methylcyclohexan-1-amine (menthane diamine); and any combination thereof.

Examples of the primary monoamines (e) include aniline, 4-chloroaniline, 4-methylaniline, 4-methoxyaniline, 4-cyanoaniline, 4-aminodiphenyl oxide, 4-aminodiphenylmethane, 4-aminodiphenylsulfide, 4-aminobenzophenone, 4-aminodiphenyl, 4-aminostilbene, 4-amino-alpha-methylstilbene, methylamine, 4-amino-4'-nitrostilbene, n-hexylamine, cyclohexylamine, aminonorbornane, N,N-diethyltrimethylenediamine; 2,6-dimethylaniline; and any combination thereof. When ammonia is used as the reactive compound (B) of the present invention, the ammonia may be used in the form of liquified ammonia ($NH_3$) or ammonium hydroxide ($NH_4OH$).

Examples of the sulfonamides (f) include phenylsulfonamide, 4-methoxyphenylsulfonamide, 4-chlorophenylsulfonamide, 4-bromophenylsulfonamide, 4-methylsulfonamide, 4-cyanosulfonamide, 4-sulfonamidodiphenyl oxide, 4-sulfonamidodiphenylmethane, 4-sulfonamidobenzophenone, 4-sulfonylamidodiphenyl, 4-sulfonamidostilbene, 4-sulfonamido-alpha-methylstilbene, 2,6-dimethyphenylsulfonamide; and any combination thereof.

Examples of the aminophenols (g) include o-aminophenol, m-aminophenol, p-aminophenol, 2-methoxy-4-hydroxyaniline, 3-cyclohexyl-4-hydroxyaniline, 2,6-dibromo-4-hydroxyaniline, 5-butyl-4-hydroxyaniline, 3-phenyl-4-hydroxyaniline, 4-(1-(3-aminophenyl)-1-methylethyl)phenol, 4-(1-(4-aminophenyl)ethyl)phenol, 4-(4-aminophenoxy)phenol, 4-((4-aminophenyl)thio)phenol, (4-aminophenyl)(4-hydroxyphenyl)methanone, 4-((4-aminophenyl)sulfonyl)phenol, N-methyl-p-aminophenol, 4-amino-4'-hydroxy-alpha-methylstilbene, 4-hydroxy-4'-amino-alpha-methylstilbene, 3,5-dimethyl-4-hydroxyaniline; 4-(1-(4-amino-3,5-dibromophenyl)-1-methylethyl)-2,6-dibromophenol; and any combination thereof.

Examples of the aminocarboxylic acids (h) include 2-aminobenzoic acid, 3-aminobenzoic acid, 4-aminobenzoic acid, 2-methoxy-4-aminobenzoic acid, 3-cyclohexyl-4-aminobenzoic acid, 5-butyl-4-aminobenzoic acid, 3-phenyl-4-aminobenzoic acid, 4-(1-(3-aminophenyl)-1-methylethyl)benzoic acid, 4-(1-(4-aminophenyl)ethyl)benzoic acid, 4-(4-aminophenoxy)benzoic acid, 4-((4-aminophenyl)thio)benzoic acid, (4-aminophenyl)(4-carboxyphenyl)methanone, 4-((4-aminophenyl)sulfonyl)benzoic acid, N-methyl-4-aminobenzoic acid, 4-amino-4'-carboxy-alpha-methylstilbene, 4-carboxy-4'-amino-alpha-methylstilbene, glycine, N-methylglycine, 4-aminocyclohexanecarboxylic acid, 4-aminohexanoic acid, 4-piperidinecarboxylic acid, 5-aminophthalic acid, 3,5-dimethyl-4-aminobenzoic acid; 2,6-dibromo-4-aminobenzoic acid; 4-(1-(4-amino-3,5-dibromophenyl)-1-methylethyl)-2,6-dibromobenzoic acid; and any combination thereof.

Examples of the carboxylic acids (i) include 2-hydroxybenzoic acid, 3-hydroxybenzoic acid, 4-hydroxybenzoic acid, 2-methoxy-4-hydroxybenzoic acid, 3-cyclohexyl-4-hydroxybenzoic acid, 5-butyl-4-hydroxybenzoic acid, 3-phenyl-4-hydroxybenzoic acid, 4-(1-(3-hydroxyphenyl)-1-methylethyl)benzoic acid, 4-(1-(4-hydroxyphenyl)ethyl)benzoic acid, 4-(4-hydroxyphenoxy)benzoic acid, 4-((4-hydroxyphenyl)thio)benzoic acid, (4-hydroxyphenyl)(4-carboxyphenyl)methanone, 4-((4-hydroxyphenyl)sulfonyl)benzoic acid, 4-hydroxy-4'-carboxy-alpha-methylstilbene, 4-carboxy-4'-hydroxy-alpha-methylstilbene, 2-hydroxyphenylacetic acid, 3-hydroxyphenylacetic acid, 4-hydroxyphenylacetic acid, 4-hydroxyphenyl-2-cyclo-hexanecarboxylic acid, 4-hydroxyphenoxy-2-propanoic acid, 4-(1-(4-hydroxy-3,5-dibromophenyl)-1-methylethyl)-2,6-dibromobenzoic acid; 3,5-dimethyl-4-hydroxybenzoic acid; 2,6-dibromo-4-hydroxybenzoic acid; and any combination thereof.

Examples of the sulfanilamides (j) include o-sulfanilamide, m-sulfanilamide, p-sulfanilamide, 2-methoxy-4-aminobenzoic acid, 3-methyl-4-sulfonamido-1-aminobenzene, 5-methyl-3-sulfonamido-1-aminobenzene, 3-phenyl-4-sulfonamido-1-aminobenzene, 4-(1-(3-sulfonamidophenyl)-1-methyl-ethyl)aniline, 4-(1-(4-sulfonamidophenyl)ethyl)aniline, 4-(4-sulfonamidophenoxy)aniline, 4-((4-sulfonamidophenyl)thio)aniline, (4-sulfonamidophenyl)(4-aminophenyl)methanone, 4-((4-sulfonamidophenyl)sulfonyl)aniline, 4-sulfonamido-1-N-methylaminobenzene, 4-amino-4'-sulfonamido-alpha-methylstilbene, 4-sulfonamido-4'-amino-alpha-methylstilbene, 4-(1-(4-sulfonamido-3,5-dibromophenyl)-1-methylethyl)-2,6-dibromo-aniline; 2,6-dimethyl-4-sulfonamido-1-aminobenzene; and any combination thereof.

Another embodiment of the present invention is a hybrid adduct comprising the reaction product of (A) the H-PACE resin described above; (B) the reactive compound described above; and (C) an epoxy resin compound; wherein the epoxy resin compound (C) comprises one or more epoxy resins other than the H-PACE resin, component (A). The epoxy resin which can be used as the epoxy resin compound (C) other than the H-PACE resin may be any epoxide-containing compound which has an average of more than one epoxide group per molecule. The epoxy resin (including advanced epoxy resins) which can be used as the epoxy resin compound (C) herein include those epoxy resins described in co-pending U.S. Patent Application Ser. No. 61/388,059, incorporated herein by reference.

According to the present invention, a sufficient amount of the H-PACE resin (A) and the epoxy resin compound (C), if used, and an excess amount of the reactive compound (B) are provided in a reaction mixture to form the hybrid adduct of the present invention. At the end of the reaction for forming the hybrid adduct of the present invention, essentially all of the epoxide groups in the H-PACE resin (A) are reacted with reactive hydrogen atoms in the reactive compound (B). The unreacted reactive compound (B) may be removed at the end of the reaction or may remain as a part of the adduct product.

In general, the ratio of the reactive compound (B) and the H-PACE resin (A) is from about 2:1 to about 100:1, preferably from about 3:1 to about 60:1, and more preferably from about 4:1 to about 40:1 equivalents of the reactive hydrogen atom in the reactive compound (B) per equivalent of epoxide group in the H-PACE resin (A) and epoxy resin compound (C), if used.

An optional catalyst, component (D), may be employed to prepare the hybrid adduct of the present invention. Examples of the catalyst include phosphines, quaternary ammonium compounds, phosphonium compounds, sulfonium compounds, tertiary amines, and any mixture thereof.

The amount of catalyst (D) used, if any, depends upon the particular reactants used for preparing the hybrid adduct and the type of catalyst employed. In general, the catalyst may be used in an amount of from about 0.01 weight percent (wt %) to about 1.5 wt %, and preferably from about 0.03 wt % to about 0.75 wt % based on the total weight of the hybrid adduct.

One or more optional solvents may be present in the adduct forming reaction of the present invention. The presence of a solvent or solvents, component (E), can improve the solubility of the reactants or, if the reactant is in a solid form, dissolve the solid reactant for easy mixing with other reactants. The presence of the solvent may also dilute the concentration of the reactants in order to moderate the adduct forming reaction such as to control heat generated from the adduct forming reaction or to lower the effective concentration of a reactant which can in turn influence the structure of the hybrid adduct product, for example, produce a hybrid adduct with less oligomeric component derived from the adduct forming reaction.

The solvent may be any solvent which is substantially inert to the adduct forming reaction including inert to the reactants, the intermediate products if any, and the final products. Examples of suitable solvents useful in the present invention include aliphatic, cycloaliphatic and aromatic hydrocarbons, halogenated aliphatic and cycloaliphatic hydrocarbons, aliphatic and cycloaliphatic secondary alcohols, aliphatic ethers, aliphatic nitriles, cyclic ethers, glycol ethers, esters, ketones, amides, sulfoxides, and any combination thereof.

Preferred examples of the solvents include pentane, hexane, octane, cyclohexane, methylcyclohexane, toluene, xylene, methylethylketone, methylisobutylketone, cyclohexanone, dimethylsulfoxide, diethyl ether, tetrahydrofuran, 1,4-dioxane, dichloromethane, chloroform, ethylene dichloride, methyl chloroform, ethylene glycol dimethyl ether, acetonitrile, isopropanol, N,N-dimethylacetamide; N,N-dimethylformamide and any combination thereof.

The solvent may be removed at the completion of the adduct forming reaction using conventional means, such as, for example, vacuum distillation. Alternatively, the solvent may also be left in the adduct product to provide a solvent borne hybrid adduct which may be used later, for example, in the preparation of a coating or film.

The adduct forming reaction conditions may vary depending upon factors such as types and amounts of reactants employed, type and amount of catalyst used, if any, type and amount of solvent used, if any, and modes of addition of the reactants employed.

For example, the adduct forming reaction may be conducted at atmospheric (e.g. 760 mm Hg), superatmospheric or subatmospheric pressures and at temperature of from about 0° C. to about 260° C., and preferably from about 20° C. to about 200° C., and more preferably from about 35° C. to about 160° C.

The time required to complete the adduct forming reaction depends not only upon the aforementioned factors, but also upon the temperature employed. Higher temperature requires a shorter period of time, whereas lower temperature requires a longer period of time. In general, the time to complete the adduct forming reaction is preferred to be from about 5 minutes to about one week, more preferably from about 30 minutes to about 72 hours, and most preferably from about 60 minutes to 48 hours.

The time and temperature may have significant impact on the distribution of components in the formation of the hybrid adduct of the present invention. For example, with higher reaction temperature, longer reaction time, and when the reactive compound (B) comprises a material having only two reactive hydrogen atoms per molecule, the reaction favors the formation of the hybrid adduct with more oligomeric components derived from the adduct forming reaction. The reaction favors the formation of the hybrid adduct with more branched or crosslinked components when the reactive compound (B) comprises a material having more than two reactive hydrogen atoms per molecule.

In carrying out the adduct forming reaction, the H-PACE resin (A) may be directly mixed together with the reactive compound (B), added to the reactive compound (B) in incremental steps, or added to the reactive compound (B) continuously. In addition, one or more solvents may be first added to the H-PACE resin (A) and/or the reactive compound (B) before mixing the H-PACE resin (A) and the reactive compound (B).

If incremental addition of the H-PACE resin (A) is used, all or a part of an added increment may be allowed to react prior to addition of the next increment. The incremental addition of the H-PACE resin (A) reacted within an excess amount of the reactive compound (B) generally favors the formation of the hybrid adduct with a lesser amount or free of oligomeric components derived from the adduct forming reaction.

Various post treatments may be applied to the process of preparing the hybrid adduct of the present invention in order to modify: (1) the distribution of components of the hybrid adduct [e.g. distribution of the amount of the components present in the hybrid adduct formed from the H-PACE resin (A)], (2) the reactivity of the hybrid adduct, and/or (3) the physical properties of the hybrid adduct.

For example, for a hybrid adduct prepared from the H-PACE resin (A) and cyclohexylamine (B), when a large stoichiometric excess amount of the primary amine groups derived from the cyclohexylamine is used to react with the epoxide groups derived from the H-PACE resin, the reaction may lead to the formation of a hybrid adduct with a low content of oligomeric component derived from the adduct forming reaction. The resultant adduct product may also comprise, as a part of the adduct product, a high concentration of cyclohexylamine as the unreacted reactive compound (B). Accordingly, post treatment of the adduct product, such as vacuum distillation, may be employed to strip out the unreacted reactive compound (B).

Other post treatment methods used to modify the distribution of the hybrid adduct components may also be employed, such as, for example, recrystallization, chromatographic separation, extraction, zone refining, crystal refining, falling film distillation, wiped film distillation, vacuum distillation, preferential chemical derivatization and removal of one or more components of the hybrid adduct, and any combination thereof.

According to the present invention, the reaction of the H-PACE resin (A) and the reactive compound (B) to form the hybrid adduct of the present invention involves a ring opening reaction. During the ring opening reaction, the epoxide groups in the H-PACE resin (A) react with the reactive hydrogen atoms in the reactive compound (B) to give characteristic 2-hydroxylpropyl functionalities as linkages between residual structures of the H-PACE resin (A) and residual structures of the reactive compound (B).

An example of the hybrid adduct of the present invention may be a reaction product of H-PACE resin (A) isolated from the epoxy resin produced by epoxidation of cis-, trans-1,3- and 1,4-cyclohexanedimethanol with addition of MGE and DGE of 1,3-dihydroxy-2,2-dimethylpropane and cyclohexylamine (B). For this example, only the result of the adduct forming reaction using the hybrid oligomer component of the PACE resin (A) found at 472 amu (Reference Example 1D.) is shown. The following hybrid adduct structure shows the 2-hydroxylpropyl functionality as the linkage between the residual structure of the component of the PACE resin (A) and the residual structure of the reactive compound (B) (geometrical isomers and substitution are not shown):

a hybrid adduct with different functional groups of different reactivity for curing an epoxy resin. An example of this type of hybrid adduct is a reaction product of an aminophenol compound, p-N-methylaminomethylphenol (B), and the H-PACE resin (A) isolated from the epoxy resin produced by epoxidation of cis-, trans-1,3- and 1,4-cyclohexanedimethanol with addition of MGE and DGE of 1,3-dihydroxy-2,2-dimethylpropane. The reaction provides the hybrid adduct with phenolic hydroxyl terminated groups when the reaction is under mild conditions including, for example, (a) with no catalyst, (b) at low temperature (e.g. about 25° C. to about 50° C.), (c) for a relatively long reaction time, (d) using incremental or slow continuous addition of the H-PACE resin (A) to a large stoichiometric excess of the reactive compound (B), and (e) both the H-PACE resin (A) and the reactive compound (B) are in solvent.

The following adduct structure for this example shows only result of the adduct forming reaction using the hybrid oligomer component of the H-PACE resin (A) found at 472 amu (Reference Example 1D.) and comprising phenolic hydroxyl terminated groups (geometrical isomers and substitution are not shown):

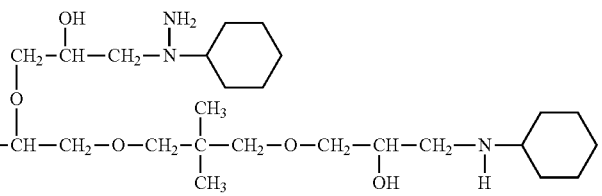
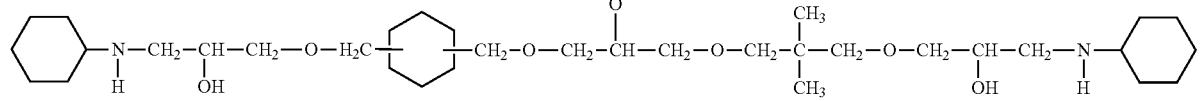

The reactive compound (B) may selected from the compounds having dual functional groups, such as (f) sulfonamides, (g) aminophenols, (h) aminocarboxylic acids, (i) phenolic hydroxyl containing carboxylic acids, and (j) sulfanilamides. These compounds may be utilized to provide

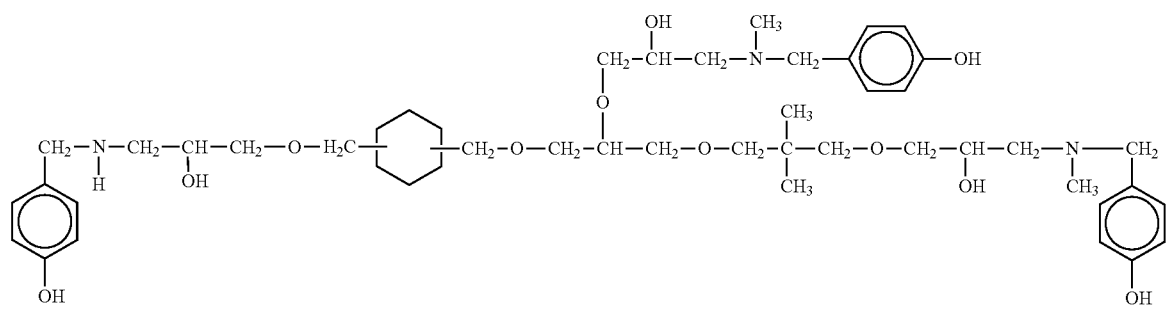

A reaction using catalysis favoring one functional group over another with the epoxide group may also be employed. For example, when a reactive compound (B) comprising at least two different functional groups each bearing at least one reactive hydrogen atom is used to form the hybrid adduct of the present invention, a catalyst which favors a reaction of reactive hydrogen atom(s) of one type of functional group with an epoxide group over a reaction of reactive hydrogen atom(s) of the other type of functional group with an epoxide group may be employed.

The hybrid adduct may also comprise at least one oligomeric component formed via a reaction of epoxide groups from at least two separate epoxy resin containing molecules with each respective epoxy resin having one of the epoxide groups already reacted with the reactive hydrogen atoms in the reactive compound (B).

An example of this type of hybrid adduct is a reaction product of the H-PACE resin (A) isolated from the epoxy resin produced by epoxidation of cis-, trans-1,3- and 1,4-cyclohexanedimethanol with addition of MGE and DGE of 1,3-dihydroxy-2,2-dimethylpropane and cyclohexylamine (B). The following adduct structure for this example shows only the result of the adduct forming reaction using the hybrid oligomer component of the H-PACE resin (A) found at 472 amu (Reference Example 1D.) (geometrical isomers and substitution are not shown). This hybrid adduct structure shows that the oligomeric component from the adduct forming reaction is derived from at least two epoxide groups from two separate H-PACE resins each with one of the epoxide groups already reacted with cyclohexylamine:

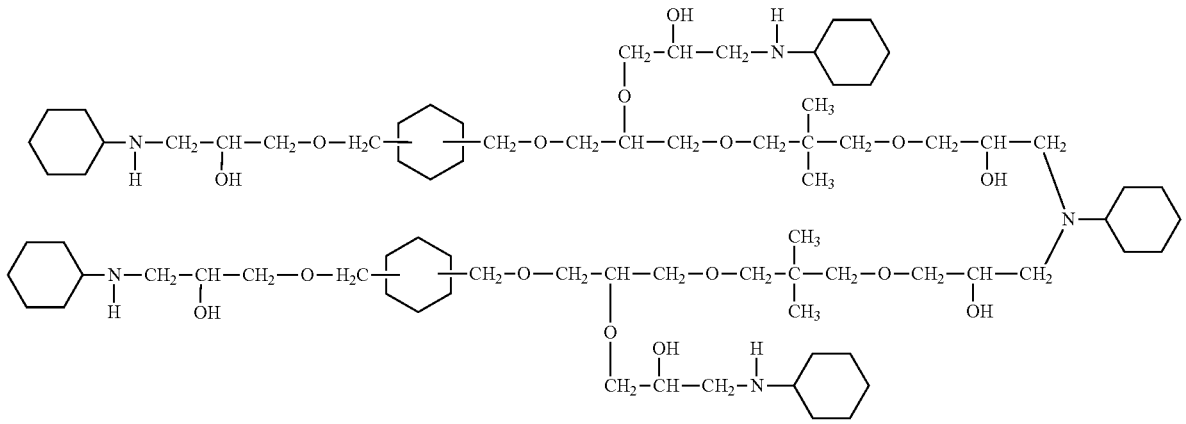

The hybrid adduct may also comprise at least one branched or crosslinked adduct structure derived from any one of the following reactions:

(1) a reaction between an epoxide group from an epoxy resin containing molecule which has already been adducted at another epoxide group of the epoxy resin and a hydroxyl group of a 2-hydroxypropyl linkage from an adduct of the present invention; or (2) a reaction between three separate epoxy resin containing molecules with three reactive hydrogen atoms from the reactive compound (B) of the present invention.

An example of the above reaction (1) is a reaction of a hydroxyl group from a hybrid adduct of the reaction product of the H-PACE resin (A) isolated from the epoxy resin produced by epoxidation of cis-, trans-1,3- and 1,4-cyclohexanedimethanol with addition of MGE and DGE of 1,3-dihydroxy-2,2-dimethylpropane and cyclohexylamine (B) with a reaction product of the H-PACE resin (A) isolated from the epoxy resin produced by epoxidation of cis-, trans-1,3- and 1,4-cyclohexanedimethanol with addition of MGE and DGE of 1,3-dihydroxy-2,2-dimethylpropane, which has already been adducted with cyclohexylamine (B) at one of the epoxide groups. The following adduct structure for this example shows only the result of the adduct forming reaction using the hybrid oligomer component of the H-PACE resin (A) found at 472 amu (Reference Example 1D.) (geometrical isomers and substitution are not shown):

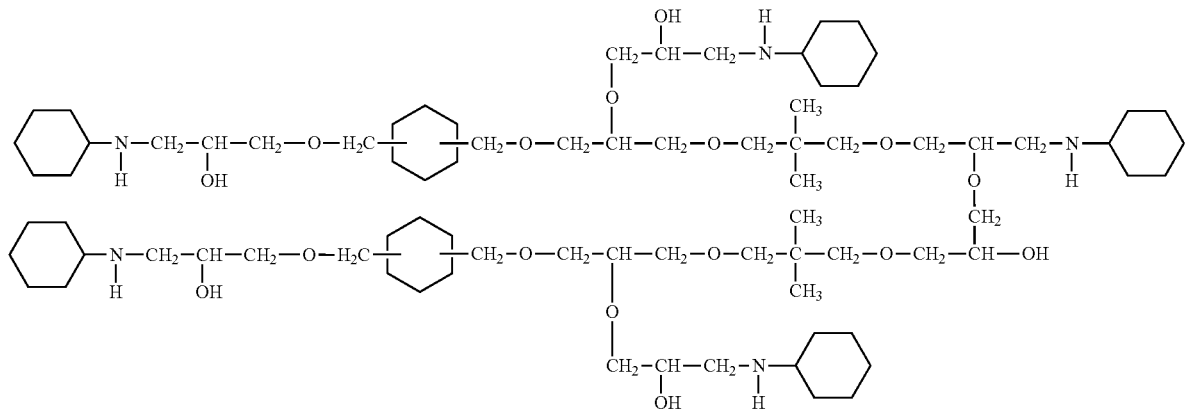

An example of the above reaction (2) is a reaction of an amino hydrogen of the adduct of diethylenetriamine and the H-PACE resin (A) isolated from the epoxy resin produced by epoxidation of cis-, trans-1,3- and 1,4-cyclohexanedimethanol with addition of MGE and DGE of 1,3-dihydroxy-2,2-dimethylpropane wherein an epoxide group from a second H-PACE resin (A) isolated from the epoxy resin produced by epoxidation of cis-, trans-1,3- and 1,4-cyclohexanedimethanol with addition of MGE and DGE of 1,3-dihydroxy-2,2-dimethylpropane has already reacted with another amino hydrogen in the diethylenetriamine moiety. The following partial adduct structure for this example shows only the result of the adduct forming reaction using the hybrid oligomer component of the H-PACE resin (A) found at 472 amu (Reference Example 1D.) (geometrical isomers and substitution are not shown):

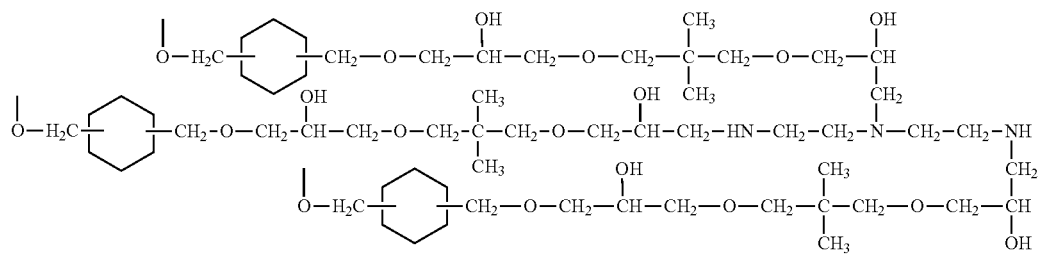

In addition, some minor structures may be present in the hybrid adduct of the present invention, for example, 1,2-glycol groups derived from a hydrolysis of an epoxide group in the H-PACE resin (A), or halomethyl groups derived from an addition of epihalohydrin to a hydroxyl group of an intermediate halohydrin molecule during the process of forming the H-PACE resin (A).

Other minor structures may be formed via reaction of a backbone hydroxyl group in the hybrid adduct of the H-PACE resin (A). For example, a reaction of the secondary hydroxyl group with a carboxylic acid group present in certain of the reactive compounds (B), results in the formation of a backbone ester linkage in the hybrid adduct.

The curable epoxy resin composition of the present invention comprises (I) a hybrid adduct as described above; and (II) at least one epoxy resin compound; wherein the epoxy resin compound (II) comprises one or more epoxy resins including a H-PACE resin (A). The hybrid adduct (I) of the present invention as described above acts as a curing agent in the curable composition.

The term "curable" (also referred to as "thermosettable") means that the composition is capable of being subjected to conditions which will render the composition to a cured or thermoset state or condition. The term "cured" or "thermoset" is defined by L. R. Whittington in *Whittington's Dictionary of Plastics* (1968) on page 239 as follows: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The curable epoxy resin composition of the present invention is prepared by mixing the hybrid adduct of the present invention, component (I), with the epoxy resin compound, component (II), in amounts which will effectively cure the curable epoxy resin composition, with the understanding that the amounts will depend upon the specific hybrid adduct and the epoxy resin compound employed. Generally, the ratio of the hybrid adduct of the present invention and the epoxy resin compound is from about 0.60:1 to about 1.50:1, and preferably from about 0.95:1 to about 1.05:1 equivalents of reactive hydrogen atom present in the hybrid adduct per equivalent of epoxide group in the epoxy resin compound at the conditions employed for curing.

The epoxy resin which can be used as the epoxy resin compound (II) for the curable composition of the present invention may be any epoxide-containing compound which has an average of more than one epoxide group per molecule. Examples of the epoxy resin include those epoxy resins which are suitable for the epoxy resin compound (C) and the H-PACE resin (A) described above.

A preferred curable epoxy resin composition of the present invention comprises (I) the hybrid adduct of the present invention and the epoxy resin compound (II), wherein the epoxy resin compound comprises one or more of an aliphatic or cycloaliphatic epoxy resin. As a specific example, the hybrid adduct of the present invention and the diglycidyl ether of cis-, trans-1,3- and 1,4-cyclohexanedimethanol comprise the curable epoxy resin composition.

Another preferred embodiment of the curable epoxy resin composition of the present invention comprises (I) the hybrid adduct of the present invention and (II) the epoxy resin compound, wherein the resin compound comprises one or more of an aliphatic or cycloaliphatic epoxy resin, and wherein the hybrid adduct comprises at least one reaction product of a H-PACE resin (A) and an aliphatic or cycloaliphatic reactive compound (B). The reactive compound (B), for example, comprises an aliphatic or cycloaliphatic diamine, an aliphatic or cycloaliphatic polyamine, or any combination thereof. As a specific example, the (I) hybrid adduct of the present invention comprising the reaction product of the H-PACE resin (A) and a polyalkylenepolyamine (B) and the (II) diglycidyl ether of cis-, trans-1,3- and 1,4-cyclohexanedimethanol comprise the curable epoxy resin composition. As a second specific example, the (I) hybrid adduct of the present invention comprising the reaction product of the H-PACE resin (A) and a polyalkylenepolyamine (B) and the (II) H-PACE resin comprise the curable epoxy resin composition. The curable epoxy resin composition, when cured, provides a cured epoxy resin free of any aromatic group.

The curable epoxy resin composition of the present invention may also comprise an optional epoxy resin curing agent and/or a curing catalyst. Examples of the curing agent and/or catalyst useful for the curable epoxy resin composition include aliphatic, cycloaliphatic, polycycloaliphatic or aromatic primary monoamines, aliphatic, cycloaliphatic, polycycloaliphatic or aromatic primary and secondary polyamines, carboxylic acids and anhydrides thereof, aromatic hydroxyl containing compounds, imidazoles, guanidines, urea-aldehyde resins, melamine-aldehyde resins, alkoxylated urea-aldehyde resins, alkoxylated melamine-aldehyde resins, amidoamines, epoxy resin adducts, or any combination thereof.

Particularly preferred examples of the curing agent include methylenedianiline, dicyandiamide, ethylenediamine, diethylenetriamine, triethylenetetramine, tetraethylenepentamine, urea-formaldehyde resins, melamine-formaldehyde resins, methylolated urea-formaldehyde resins, methylolated melamine-formaldehyde resins, phenol-formaldehyde novolac resins, cresol-formaldehyde novolac resins, sulfanilamide, diaminodiphenylsulfone, diethyltoluenediamine, t-butyltoluenediamine, bis-4-aminocyclo-hexylamine, bis(aminomethyl)norbornane, isophoronediamine, diaminocyclohexane, hexamethylenediamine, piperazine, 1-(2-aminoethyl)piperazine, 4,4'-diaminostilbene; 4,4'-diamino-alpha-methylstilbene; 4,4'-diaminobenzanilide; 2,5-dimethyl-2,5-hexanediamine; 1,12-dodecanediamine; tris-3-aminopropylamine; 1,3-xylenediamine; 2,2'-bis(4-aminocyclohexyl)propane; 4-(2-aminopropan-2-yl)-1-methylcyclohexan-1-amine(menthane diamine) and any combination thereof.

Particularly preferred examples of the curing catalyst include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, metallic acylates such as stannous octoate or zinc octoate, and any combination thereof.

The curing catalyst may be employed in an amount which will effectively cure the curable epoxy resin composition. The amount of the curing catalyst will also depend upon the particular hybrid adduct, epoxy resin, and curing agent, if any, employed in the curable epoxy resin composition.

Generally, the curing catalyst may be used in an amount of from about 0.001 wt % to about 2 wt % of the total curable epoxy resin composition. In addition, one or more of the curing catalysts may be employed to accelerate or otherwise modify the curing process of the curable epoxy resin composition.

The curing agent may be employed in conjunction with the hybrid adduct to cure the curable epoxy resin composition. The amounts of combined curing agent and hybrid adduct are from about 0.60:1 to about 1.50:1, and preferably from about 0.95:1 to about 1.05:1 equivalents of reactive hydrogen atom collectively in the curing agent and the hybrid adduct.

The curable epoxy resin composition may also be blended with at least one additive including, for example, a cure accelerator, a solvent or diluent, a modifier such as a flow modifier and/or a thickener, a reinforcing agent, a filler, a pigment, a dye, a mold release agent, a wetting agent, a stabilizer, a fire retardant agent, a surfactant, or any combination thereof. The additive may be blended with the hybrid adduct or with the epoxy resin compound (II) or with both the hybrid adduct and the epoxy resin compound (II) prior to use for the preparation of the curable epoxy resin composition of the present invention.

These additives may be added in functionally equivalent amounts, for example, the pigment and/or dye may be added in quantities which will provide the composition with the desired color. In general, the amount of the additives may be from about zero wt % to about 20 wt %, preferably from about 0.5 wt % to about 5 wt %, and more preferably from about 0.5 wt % to about 3 wt %, based upon the total weight of the curable epoxy resin composition.

The optional cure accelerator which can be employed herein includes, for example, mono, di, tri and tetraphenols; chlorinated phenols; aliphatic or cycloaliphatic mono or dicarboxylic acids; aromatic carboxylic acids; hydroxybenzoic acids; halogenated salicylic acids; boric acid; aromatic sulfonic acids; imidazoles; tertiary amines; aminoalcohols; aminopyridines; aminophenols; mercaptophenols; and any mixture thereof.

Particularly suitable cure accelerators include 2,4-dimethylphenol; 2,6-dimethylphenol; 4-methylphenol; 4-tertiary-butylphenol; 2-chlorophenol; 4-chlorophenol; 2,4-dichlorophenol; 4-nitrophenol; 1,2-dihydroxybenzene; 1,3-dihydroxybenzene; 2,2'-dihydroxybiphenyl; 4,4'-isopropylidenediphenol; valeric acid; oxalic acid; benzoic acid; 2,4-dichlorobenzoic acid; 5-chlorosalicylic acid; salicylic acid; p-toluenesulfonic acid; benzenesulfonic acid; hydroxybenzoic acid; 4-ethyl-2-methylimidazole; 1-methylimidazole; triethylamine; tributylamine; N,N-diethylethanolamine; N,N-dimethylbenzylamine; 2,4,6-tris(dimethylamino)phenol; 4-dimethylaminopyridine; 4-aminophenol; 2-aminophenol; 4-mercaptophenol; and any combination thereof.

Examples of the optional solvent or diluent which can be employed herein include, for example, aliphatic and aromatic hydrocarbons, halogenated aliphatic hydrocarbons, aliphatic ethers, aliphatic nitriles, cyclic ethers, glycol ethers, esters, ketones, amides, sulfoxides, and any combination thereof.

Particularly suitable solvents include pentane, hexane, octane, toluene, xylene, methylethylketone, methylisobutylketone, dimethylsulfoxide, acetonitrile, sulfolane, diethyl ether, tetrahydrofuran, dichloromethane, chloroform, ethylene dichloride, methyl chloroform, ethylene glycol dimethyl ether, diethylene glycol methyl ether, dipropylene glycol methyl ether, N-methylpyrrolidinone, N,N-dimethylacetamide; N,N-dimethylformamide; 1,4-dioxane; and any combination thereof.

The optional modifier such as the thickener and the flow modifier may be employed in amounts of from zero wt % to about 10 wt %, preferably, from about 0.5 wt % to about 6 wt %, and more preferably from about 0.5 wt % to about 4 wt %, based upon the total weight of the curable epoxy resin blend composition.

The optional reinforcing material which may be employed herein includes natural and synthetic fibers in the form of woven fabric, mat, monofilament, multifilament, unidirectional fiber, roving, random fiber or filament, inorganic filler or whisker, or hollow sphere. Other suitable reinforcing material includes glass, carbon, ceramics, nylon, rayon, cotton, aramid, graphite, polyalkylene terephthalates, polyethylene, polypropylene, polyesters, and any combination thereof.

The optional filler which may be employed herein includes, for example, inorganic oxide, ceramic microsphere, plastic microsphere, glass microsphere, inorganic whisker, calcium carbonate, and any combination thereof.

The filler may be employed in an amount of from about zero wt % to about 95 wt %, preferably from about 10 wt % to about 80 wt %, and more preferably from about 40 wt % to about 60 wt % based upon the total weight of the curable epoxy resin composition.

The process of curing the curable epoxy resin composition of the present invention may be conducted at atmospheric (e.g. 760 mm Hg), superatmospheric or subatmospheric pressures and at a temperature from about 0° C. to about 300° C., preferably from about 25° C. to about 250° C., and more preferably from about 50° C. to about 200° C.

The time required to complete the curing may depend upon the temperature employed. Higher temperatures generally require a shorter period of time whereas lower temperatures generally require longer periods of time. In general, the required time for completion of the curing is from about 1 minute to about 48 hours, preferably from about 15 minutes to about 24 hours, and more preferably from about 30 minutes to about 12 hours. It is also operable to partially cure the curable epoxy resin composition of the present invention to form a B-stage product and subsequently cure the B-stage product completely at a later time.

The hybrid adduct of the present invention may be useful as a aliphatic or cycloaliphatic curing agent for producing a cured epoxy resin, including production of fully aliphatic/cycloaliphatic cured epoxy resin (with no aromatic rings).

The hybrid adduct may also be employed in, for example, coatings, especially protective coatings with excellent solvent resistant, moisture resistant, abrasion resistant, and weatherable (UV resistant, non-chalking) properties. Other applications of the hybrid adduct of the present invention may include, for example, use as a reactive toughener for thermosets including epoxy resin based thermosets, can and coil coatings, maintenance coatings including coatings for stone, concrete and flooring, marine coatings including anti-fouling coatings, powder coatings including both decorative and functional types, automotive coatings, corrosion resistant coatings, electrical or structural laminates and composites, electronics, aerospace, encapsulation, general castings, coatings for other plastics and metals, sealants, filament windings, moldings, polymer modified concrete, binders, adhesives including window glass adhesives, paints, lacquers and varnishes.

EXAMPLES

The following standard abbreviations are used in the Examples, Reference Examples and Comparative Examples: "GC" stands for gas chromatography (chromatographic); "MS" stands for mass spectrometry (spectrometric); "DSC" stands for differential scanning calorimetry; "Tg" stands for glass transition temperature(s); "EEW" stands for epoxide equivalent weight; "AHEW" stands for amine hydrogen equivalent weight; "DI" stands for deionized; "meq" stands for milliequivalent(s); "eq" stands for equivalent(s); "wt" stands for weight(s); "min" stands for minute(s); "hr" stands for hour(s); "g" stands for gram(s); "mL" stands for milliliter(s); "L" stands for liter(s); "LPM" stands for liter(s) per minute; "µm" stands for micrometer(s); "mm" stands for millimeter(s); "m" stands for meter(s); "cp" stands for centipoise; and "DETA" stands for diethylenetriamine.

In the following Examples, Reference Examples and Comparative Examples, standard analytical equipment and methods are used such as for example, the following:

Gas Chromatographic Analysis: Area %

In the general method, a pair of identically equipped Hewlett Packard 5890 Series II Plus gas chromatographs were used. Each GC was equipped with a DB-1 capillary column (61.4 m by 0.25 mm with a 0.25 µm film thickness, Agilent). The column was maintained in the chromatograph oven at a 50° C. initial temperature. Both the injector inlet and flame ionization detector were maintained at 300° C. Helium carrier gas flow through the column was maintained at 1.1 mL per min. For the analyses of the epoxy resins during synthesis or from the rotary evaporation, an initial 50° C. oven temperature with heating at 12° C. per min to a final temperature of 300° C. revealed that essentially all light boiling components, including residual epichlorohydrin, cyclohexanedimethanols and monoglycidyl ethers of the cyclohexanedimethanols had been removed by the rotary evaporation. For the analyses of the H-PACE resins and re-epoxidized H-PACE resins, an initial 250° C. oven temperature with heating at 13.3° C. per min to a final temperature of 300° C. was employed for complete elution of all oligomeric components within 50 min total time for the analysis. The small variation in retention time ranges for the clusters of peaks in Reference Example 1 and Reference Example 2 is due to the fact that each sample was analyzed on a different GC. GC analyses in area % are not a quantitative measure of any given component.

Samples for GC analysis were prepared by collection of a 0.5 mL aliquot of the slurry product from the epoxidation and addition to a vial containing 1 mL of acetonitrile. After shaking to mix, a portion of the slurry in acetonitrile was loaded into a 1 mL syringe (Norm-Ject, all polypropylene/polyethylene, Henke Sass Wolf GmBH) and passed through a syringe filter (Acrodisc CR 13 with 0.2 µm PTFE membrane, Pall Corporation, Gelman Laboratories) to remove any insoluble debris.

Internally Standardized Gas Chromatographic (GC) Analysis for Weight Percent Residual Diglycidyl Ethers of Cis-, Trans-1,3- and 1,4-Cyclohexanedimethanol A single point internal standard method was developed for GC analysis of residual diglycidyl ethers of cis-, trans-1,3- and 1,4-cyclohexanedimethanol remaining in the H-PACE resin (distillation pot) product and the re-epoxidized H-PACE resin. Cyclohexanone was selected as the internal standard since it had a retention time that was different from that of any other components observed in the analyses of the UNOXOL™ Diol epoxidation product. For the diglycidyl ether of UNOXOL™ Diol standard, a distillation cut was employed. This distillation cut contained 0.71 wt % monoglycidyl ethers and 99.29 wt % diglycidyl ethers. A 0.2500 g sample of the standard of the diglycidyl ethers plus 0.7500 g of acetonitrile plus 5 μL of cyclohexanone weighing 0.0047 g. were added to a glass vial. Three separate injections were made in the GC and the resultant area counts were averaged for the cyclohexanone and for the diglycidyl ether. This data was used to calculate the internal response factor, as follows:

Internal Response Factor=(area internal standard)(amount diglycidyl ethers)/(amount internal standard)(area diglycidyl ethers)

An aliquot (0.2500 g) of the PACE resin, acetonitrile (0.7500 g) and cyclohexanone (5 μL, 0.0042 g) were added to a glass vial and analyzed by GC. Using the data from the GC analysis plus the internal response factor, the following calculation was performed:

Amount Diglycidyl Ethers=(amount internal standard) (area diglycidyl ethers)(Internal Response Factor) (area internal standard)

In a similar manner, an aliquot of the re-epoxidized PACE resin, acetonitrile and cyclohexanone were added to a glass vial and analyzed by GC.

Percent Epoxide/Epoxide Equivalent Weight Analysis

A standard titration method was used to determine percent epoxide in the various epoxy resins. General methods for this titration are found in the scientific literature, for example, Jay, R. R., "Direct Titration of Epoxy Compounds and Aziridines", Analytical Chemistry, 36, 3, 667-668 (March, 1964). Briefly, in the present adaptation of these methods, the carefully weighed sample (sample weight ranges from 0.17-0.18 g using a scale with 4 decimal place accuracy) was dissolved in dichloromethane (15 mL) followed by the addition of tetraethylammonium bromide solution in acetic acid (15 mL). The resultant solution was treated with 3 drops of crystal violet solution (0.1% w/v in acetic acid) and was titrated with 0.1N perchloric acid in acetic acid on a Metrohm 665 Dosimat titrator (Brinkmann). Titration of a blank sample comprising dichloromethane (15 mL) and tetraethylammonium bromide solution in acetic acid (15 mL) provided correction for solvent background. Percent epoxide and EEW were calculated using the following equations:

$$\% \text{ Epoxide} = \frac{[(\text{mL titrated sample}) - (\text{mL titrated blank})](0.4303)}{(g \text{ sample titrated})}$$

$$EEW = \frac{4303}{\% \text{ epoxide}}$$

Differential Scanning Calorimetry (DSC)

For analysis of curing of the thermosettable blend of the diglycidyl ether, the H-PACE resin or re-epoxidized H-PACE resin with DETA or a DETA adduct of the present invention a DSC 2910 Modulated DSC (TA Instruments) was employed, using a heating rate of 7° C. per min from 0° C. to 300° C. under a stream of nitrogen flowing at 35 cubic centimeters per min. Each sample was contained in an aluminum pan and loosely covered (not sealed) with an aluminum lid. The respective sample weight tested is given with the results obtained.

For analysis of curing of the thermosettable blend of the diglycidyl ether of UNOXOL™ Diol (cis-, trans-1,3- and 1,4-cyclohexanedimethanol) cured with a DETA adduct of the present invention and the Tg of the thermoset thereof, the aforementioned conditions were employed, but with an end temperature of 250° C.

For analysis of Tg of a cured epoxy resin, the aforementioned conditions were employed, but with an end temperature of 250° C. for the first and second scannings and an end temperature of 300° C. for the third and fourth scannings.

I.C.I. Cone and Plate Viscosity

Viscosity was determined on an I.C.I. Cone and Plate Viscometer Viscosity (model VR-4540) at 25° C. The viscometer equipped with a 0-40 poise spindle (model VR-4140) and equilibrated to 25° C. was calibrated to zero. A sample was applied to the viscometer and held for 2 minutes, then the viscosity was checked and the reading was taken after 15 seconds. Five duplicate viscosity tests were completed using fresh aliquots of the particular product being tested. The individual measurements were averaged.

The following Examples, Reference Examples, and Comparative Examples further illustrate the present invention in detail but are not to be construed to limit the scope thereof. It will be apparent to persons skilled in the art that certain changes may be made in the methods described below without departing from the scope of the invention. It is therefore intended that all matter herein disclosed be interpreted as illustrative only and not as limiting the scope of protection sought. Moreover, the process of the present invention is not to be limited by the specific examples set forth above. Rather, these examples are illustrative of the process of the invention.

Reference Example 1

Two Stage Synthesis of Hybrid Epoxy Resin of cis-, trans-1,3 and 1,4-Cyclohexanedimethanol with Recycle of Monoglycidyl Ether and Diglycidyl Ether of 1,3-Dihydroxy-2,2-dimethylpropane in Stage 1

Epoxidation of cis-, trans-1,3- and 1,4-cyclohexanedimethanol (UNOXOL™ Diol) was performed using two stages of aqueous sodium hydroxide addition with addition of MGE and DGE of 1,3-dihydroxy-2,2-dimethylpropane in the first stage followed by fractional vacuum distillation to separate the constituents of the epoxy resin:

A. Epoxidation Reaction

A 5 L, 4 neck, glass, round bottom reactor was charged with UNOXOL™ Diol (432.63 g, 3.0 moles, 6.0 hydroxyl eq), epichlorohydrin (1110.24 g, 12.0 moles, 2:1 epichlorohydrin:UNOXOL™ Diol hydroxyl eq ratio), toluene (2.5 L), benzyltriethylammonium chloride (43.62 g, 0.1915 mole), and a recycle stream consisting of MGE of 1,3-dihydroxy-2,2-dimethylpropane (27.46 g, 0.1714 mole) and DGE of 1,3-dihydroxy-2,2-dimethylpropane (95.08 g, 0.4396 mole) in the indicated order. The reactor was additionally equipped with a condenser (maintained at 0° C.), a thermometer, a Claisen adaptor, an overhead nitrogen inlet (1 LPM N2 used), and a stirrer assembly (Teflon™ paddle, glass shaft, variable speed motor). [Teflon™ fluorocarbon resin is a trademark of E.I. duPont de Nemours.] A controller monitored the temperature registered on the thermometer in the reactor and provided heating via the heating mantle placed under the reactor as well as cooling delivered by a pair of fans positioned on the reactor exterior. Sodium hydroxide (360.0 g, 9.0 moles) dissolved in DI water (360 g) for the initial addition was added to a side arm vented addition funnel, sealed with a ground glass stopper, then attached to the reactor. Stirring commenced to give a 22° C. mixture followed by commencement of dropwise addition of the aqueous sodium hydroxide solution. The reaction mixture was allowed to self-heat during the aqueous sodium hydroxide addition time to a limit of 40° C. and then held at that temperature, if achieved, via cooling from the fans as needed. Thus, after 232 min, 100% of the aqueous sodium hydroxide was added causing the reaction temperature to reach 37° C. A sample was taken for GC analysis one hour after completion of the aqueous sodium hydroxide addition. After normalization to remove solvents (acetonitrile and toluene) and unreacted epichlorohydrin the GC analysis revealed the presence of 4.57 area % light components, 2.97 area % MGE of 1,3-dihydroxy-2,2-dimethylpropane; 8.68 area % unreacted cis-, trans-1,3- and 1,4-cyclohexanedimethanol; 10.14 area % DGE of 1,3-dihydroxy-2,2-dimethylpropane; 0.13 area % of a pair of peaks associated with the MGE of cis-, trans-1,3- and 1,4-cyclohexanedimethanol; 43.39 area % MGE of cis-, trans-1,3- and 1,4-cyclohexanedimethanol; 0.34 area % of a pair of peaks associated with the DGE of cis-, trans-1,3- and 1,4-cyclohexanedimethanol; 20.32 area % DGE of cis-, trans-1,3- and 1,4-cyclohexanedimethanol, and 9.44 area % oligomers that were volatile under the conditions of the GC analysis.

After 16.05 hr of postreaction the temperature had declined to 29° C., stirring ceased, and the reactor contents allowed to settle. The organic layer was decanted from the reactor followed by addition of 1.5 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 3.57 area % light components, 2.17 area % MGE of 1,3-dihydroxy-2,2-dimethylpropane; 3.00 area % unreacted cis-, trans-1,3- and 1,4-cyclohexanedimethanol; 9.93 area % DGE of 1,3-dihydroxy-2,2-dimethylpropane; 0.28 area % of a pair of peaks associated with the MGE of cis-, trans-1,3- and 1,4-cyclohexanedimethanol; 35.89 area % MGE of cis-, trans-1,3- and 1,4-cyclohexanedimethanol; 0.19 area % of a pair of peaks associated with the DGE of cis-, trans-1,3- and 1,4-cyclohexanedimethanol; 32.25 area % DGE of cis-, trans-1,3- and 1,4-cyclohexanedimethanol, and 12.71 area % oligomers that were volatile under the conditions of the GC analysis.

The organic layer was reloaded into the reactor along with fresh benzyltriethylammonium chloride (21.81 g, 0.1915 mole). Sodium hydroxide (180 g, 4.5 moles) dissolved in DI water (180 g) was added to a side arm vented addition funnel, sealed with a ground glass stopper, then attached to the reactor. Stirring commenced to give a 22.5° C. mixture followed by commencement of dropwise addition of the aqueous sodium hydroxide solution. The reaction mixture was allowed to self-heat during the aqueous sodium hydroxide addition time. Thus, after 89 min 73.8% of the aqueous sodium hydroxide was added causing the reaction temperature to reach a maximum of 31° C. and then remain at that temperature range for the remainder of the aqueous sodium hydroxide addition. Addition of the aqueous sodium hydroxide required a total of 125 min. After 16.95 hr of postreaction the temperature had declined to 22° C., stirring ceased, and the reactor contents allowed to settle. The organic layer was decanted from the reactor followed by addition of 1.0 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 2.45 area % light components, 1.40 area % MGE of 1,3-dihydroxy-2,2-dimethylpropane; 0.30 area % unreacted cis-, trans-1,3- and 1,4-cyclohexanedimethanol; 9.54 area % DGE of 1,3-dihydroxy-2,2-dimethylpropane; 0.29 area % of a pair of peaks associated with the MGE of cis-, trans-1,3- and 1,4-cyclohexanedimethanol; 12.95 area % MGE of cis-, trans-1,3- and 1,4-cyclohexanedimethanol; 0.18 area % of a pair of peaks associated with the DGE of cis-, trans-1,3- and 1,4-cyclohexanedimethanol; 55.43 area % DGE of cis-, trans-1,3- and 1,4-cyclohexanedimethanol, and 17.46 area % oligomers that were volatile under the conditions of the GC analysis.

B. Epoxy Resin Product Isolation

After removal of the aqueous layer from the reaction with the second aqueous sodium hydroxide addition, the organic layer was equally split between the pair of separatory funnels and the contents of each respective separatory funnel then washed with DI water (400 mL) by vigorously shaking. The washed product was allowed to settle for 2 hr, and then the aqueous layer was removed and discarded as waste. A second wash was completed using the aforementioned method, with settling overnight (20 hr) required to fully resolve the organic and aqueous layers. The combined, hazy organic solution was filtered through a bed of anhydrous, granular sodium sulfate in a 600 mL fritted glass funnel providing a transparent filtrate.

Rotary evaporation of the filtrate using a maximum oil bath temperature of 100° C. to a final vacuum of 3.3 mm of Hg removed the bulk of the volatiles. A total of 843.73 g of pale yellow colored, transparent liquid was recovered after completion of the rotary evaporation. GC analysis after normalization to remove solvent (acetonitrile) revealed the presence of 0.26 area % light components, 0.31 area % MGE of 1,3-dihydroxy-2,2-dimethylpropane; 0.07 area % unreacted cis-, trans-1,3- and 1,4-cyclohexanedimethanol; 9.41 area % DGE of 1,3-dihydroxy-2,2-dimethylpropane; 0.31 area % of a pair of peaks associated with the MGE of cis-, trans-1,3- and 1,4-cyclohexanedimethanol; 12.25 area % MGE of cis-, trans-1,3- and 1,4-cyclohexanedimethanol; 0.22 area % of a pair of peaks associated with the DGE of cis-, trans-1,3- and 1,4-cyclohexanedimethanol; 56.83 area % DGE of cis-, trans-1,3- and 1,4-cyclohexanedimethanol, and 20.34 area % oligomers that were volatile under the conditions of the GC analysis. Thus, GC analysis revealed that the light boiling components, including all residual epichlorohydrin, had been substantially removed.

C. Fractional Vacuum Distillation

A portion (843.02 g) of the product from the rotary evaporation was added to a 1 L, 3 neck, glass, round bottom reactor equipped with magnetic stirring and a thermometer for monitoring the pot temperature. A one piece integral vacuum jacketed Vigreux distillation column and head was attached to the reactor. The distillation column nominally provided 9 to 18 theoretical plates depending on the mode of operation. The distillation head was equipped with an overhead thermometer, air cooled condenser, a receiver and a vacuum takeoff. A vacuum pump was employed along with a liquid nitrogen trap and an in-line digital thermal conductivity vacuum gauge. Stirring commenced followed by application of full vacuum then progressively increased heating using a thermostatically controlled heating mantle. A clean receiver was used to collect each respective distillation cut. The final distillation cuts sought to selectively remove DGE of cis-, trans-1,3- and 1,4-cyclohexanedimethanol, leaving the oligomeric product (252.72 g) in the distillation pot. Normalization with respect to the total epoxy resin recovered from the rotary evaporation indicated 252.93 g of oligomers. GC analysis using a cyclohexanone internal standard revealed that the oligomers contained residual 4.52 wt % DGE of cis-, trans-1,3- and 1,4-cyclohexanedimethanol with the balance as the oligomers. After removal of the weight contributed by the residual DGE, the normalized weight of DGE-free oligomers was 241.50 g.

A total of 7.43 grams of unreacted MGE of 1,3-dihydroxy-2,2-dimethylpropane was removed in the distillation cuts thus demonstrating incorporation of 20.03 grams of the MGE into the oligomer product, as well as possible conversion of some of this MGE into the corresponding DGE. A total of 83.60 grams of unreacted DGE of 1,3-dihydroxy-2,2-dimethylpropane was removed in the distillation cuts. Therefore at least 11.48 grams of the DGE of 1,3-dihydroxy-2,2-dimethylpropane was incorporated into the oligomer product, with additional DGE derived from any in situ epoxidation of MGE to DGE also possibly incorporated into the oligomer product.

The final distillation cuts also sought to selectively remove DGE of cis-, trans-1,3- and 1,4-cyclohexanedimethanol free of any MGE or DGE of 1,3-dihydroxy-2,2-dimethylpropane. Thus the final three distillation cuts were combined to provide 303.34 grams of a product comprising 98.94% wt DGE of cis-, trans-1,3- and 1,4-cyclohexanedimethanol; 0.84% wt MGE of cis-, trans-1,3- and 1,4-cyclohexanedimethanol; with the balance as two minor component associated with the DGE of cis-, trans-1,3- and 1,4-cyclohexanedimethanol; and no detectable MGE or DGE of 1,3-dihydroxy-2,2-dimethylpropane.

After normalization to remove the peaks associated with acetonitrile solvent and the DGE of cis-, trans-1,3- and 1,4-cyclohexanedimethanol, the GC analysis demonstrated the following oligomeric components containing multiple isomers:

3.93 area % in 23.13-30.40 min retention time region, includes:
new hybrid oligomer components
and
2-propanol, 1-(oxiranylmethoxy)-3-[[3(or 4)-[(oxiranylmethoxy)methyl]cyclohexyl]methoxy]-
and
oxirane, 2-[[2-chloro-1-[[[3(or 4)-[(oxiranylmethoxy)methyl]cyclohexyl]methoxy]methyl]ethoxy]methyl]-

0.25 area % in 31.59-31.95 min retention time region:
new hybrid oligomer components 22.66 area % in 32.59-37.98 min retention time region:
oxirane, 2-[[[3(or 4)-[[2,3-bis(oxiranylmethoxy)propoxy]methyl]cyclohexyl]methoxy]methyl]-

0.24 area % in 38.80-39.99 min retention time region:
cyclohexanemethanol, 3(or 4)-[[2-hydroxy-3-[[3(or 4)-[(oxiranylmethoxy)methyl]cyclohexyl]methoxy]propoxy]methyl]-

11.43 area % in 40.44-47.30 min retention time region:
new hybrid oligomer components 18.98 area % in 52.59-64.00 min retention time:
2-propanol, 1,3-bis[[3(or 4)-[(oxiranylmethoxy)methyl]cyclohexyl]methoxy]-

36.94 area % in 73.86-93.31 min retention time:
oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy]methyl]-

The aforementioned 23.13-30.40 min retention time region included 4 specific clusters of peaks with the following retention time ranges: (1) 23.13-24.01 min, (2) 24.19-25.11 min, (3) 25.47-26.93 min, (4) 27.85-30.40 min As a reference point, the four isomeric DGEs eluted at 22.45-23.12 min Titration demonstrated an EEW of 201.3. I.C.I. cone and plate viscosity was 3436 cp.

D. Mass Spectrometric (MS) Analysis Using Potassium Ionization of Desorbed Species ($K^+$IDS)

The ionization technique used $K^+$IDS MS analysis providing a "parent ion" in the form of $[M+K]^+$ when a sample is placed on a $K^+$ emitting matrix of a direct exposure probe (DEP) filament and heated very rapidly inside a MS ionization source.

The $K^+$IDS MS analysis was performed using a Finnigan SSQ 7000 mass spectrometer. The $K^+$ emitting matrix on the DEP was prepared by depositing a drop from a slurry of potassium nitrate (1.02 g), aluminum oxide (0.5 g) and silicon dioxide (0.6 g) in acetone on the DEP filament. After allowing the slurry to dry, the DEP was inserted into the MS ionization source and rapidly heated using a filament current of 800 mA until the production of $K^+$ reached a steady state. This indicated complete formation of a "thermionic $K^+$ glass" bead (potassium aluminosilicate matrix). The following sequence and conditions were employed for the analysis: (a) deposit a 1 μL sample on the filament bead and insert the probe back into the MS, (b) leave MS filament off during the $K^+$IDS MS analysis, (c) set the multiplier voltage to 1800 V, (d) start data acquisition, and in the DEP instrument control window use the command ("s800") for rapid $K^+$ generation and sample vaporization. Potassium ionization MS were acquired on the desorbed components at one-second intervals for component identification. The mass spectrometer was scanned from 135-1150 amu to observe potassium attached ions. The following possible structures (note: possible isomers are not indicated) were postulated based on the analysis of a sample of the oligomer (pot product) from C. above. The relative abundance and amu after removal of 39 amu for potassium are additionally given:

5.22 relative abundance, 256 amu, DGE 4.49 relative abundance, 330 amu, 2-propanol, 1-(oxiranylmethoxy)-3-[[3(or 4)-[(oxiranylmethoxy)methyl]cyclohexyl]methoxy]-

25.35 relative abundance, 386 amu, oxirane, 2-[[[3(or 4)-[[2,3-bis(oxiranylmethoxy)propoxy]methyl]cyclohexyl]methoxy]methyl]-

4.53 relative abundance, 400 amu, cyclohexanemethanol, 3(or 4)-[[2-hydroxy-3-[[3(or 4)-[(oxiranylmethoxy)methyl]cyclohexyl]methoxy]propoxy]methyl]-

17.51 relative abundance, 416 amu, new hybrid oligomer components:

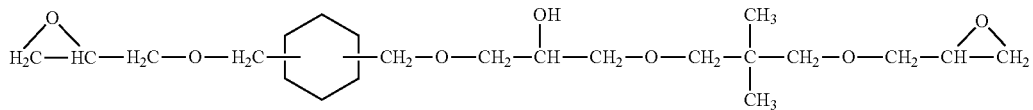

57.92 relative abundance, 456 amu, 2-propanol, 1,3-bis[[3(or 4)-[(oxiranylmethoxy)methyl]cyclohexyl]methoxy]-
20.97 relative abundance, 472 amu, new hybrid oligomer components:

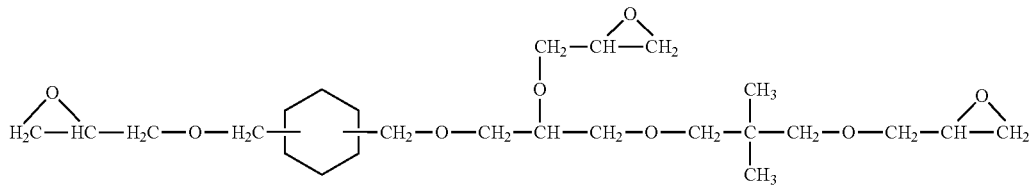

100 relative abundance, 512 amu, oxirane, 2-[[2-[[3(or 4)-[(oxiranylmethoxy)methyl]cyclohexyl]methoxy]-1-[[[3 (or 4)-[(oxiranylmethoxy)methyl]cyclohexyl]methoxy]methyl]ethoxy]methyl]-
22.46 relative abundance, 586 amu:

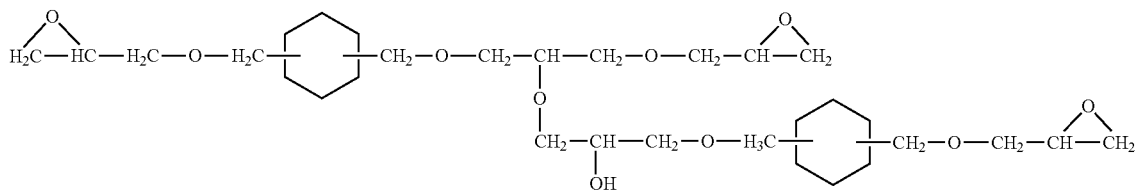

31.17 relative abundance, 642 amu:
reaction product of

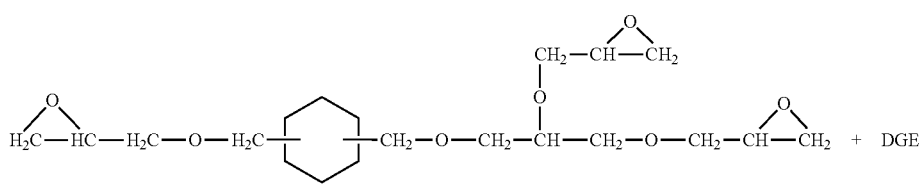

11.15 relative abundance, 656 amu:

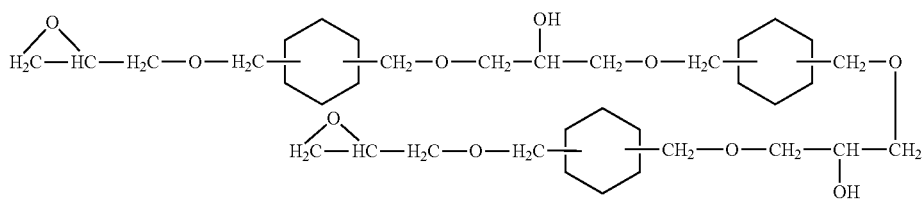

26.18 relative abundance, 672 amu, new hybrid oligomer components:

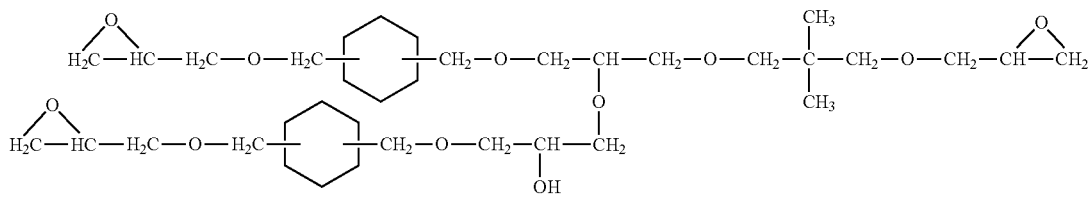

33.9 relative abundance, 712 amu:

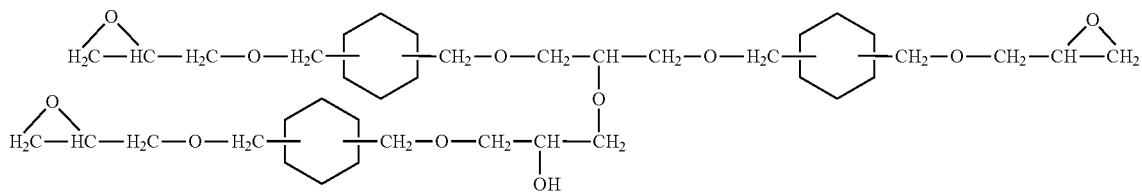

13.42 relative abundance, 728 amu, new hybrid oligomer components:
reaction product of

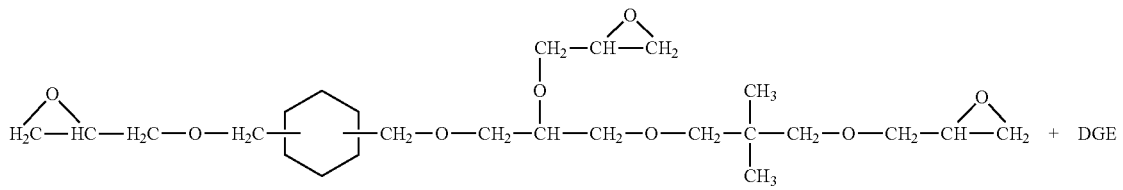

15.01 relative abundance, 768 amu:
reaction product of

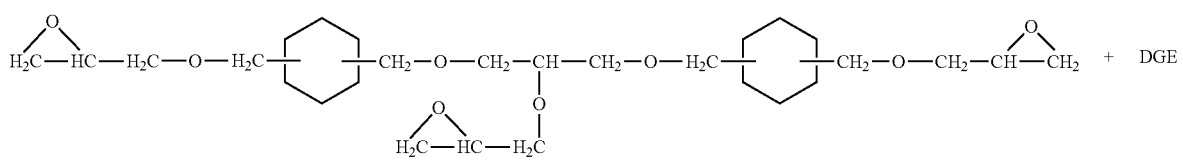

Minor amounts of components of higher amu are also indicated by the MS analysis.

Example 1

Preparation and Characterization of an Adduct of DETA and Hybrid Polyfunctional Aliphatic Cycloaliphatic Oligomer Epoxy Resin A 1 L 3 neck, glass, round bottom, reactor was charged under nitrogen with DETA (412.7 g, 4.0 moles, 20 amine hydrogen eq). The DETA used was a commercial grade product obtained from Sigma-Aldrich Chemical Company with a purity specification of 99%. The reactor was additionally equipped with a condenser (maintained at 24° C.), a thermometer, a Claisen adaptor, an overhead nitrogen inlet (1 LPM $N_2$ used), and magnetic stirring. A portion (40.25 g, 0.20 epoxide eq) of hybrid polyfunctional aliphatic cycloaliphatic oligomer epoxy resin from Reference Example 1 above was added to a side arm vented addition funnel, then attached to the reactor. Stirring and heating using a thermostatically controlled heating mantle commenced to give a 40° C. solution.

Dropwise addition of the hybrid polyfunctional aliphatic cycloaliphatic oligomer epoxy resin commenced while maintaining the reaction temperature at 40° C. After 4.15 hr, the dropwise addition was completed. The resultant light yellow colored solution was stirred and maintained at 40° C. for the next 44 hr followed by rotary evaporation at 75° C. to remove the bulk of the excess DETA. Additional rotary evaporation was completed using a maximum 140° C. oil bath temperatures to a vacuum of 0.41 mm Hg. A transparent, light yellow colored, liquid adduct product was recovered from the rotary evaporation (60.65 g). GC analysis of an aliquot of the adduct product revealed that complete reaction of all polyfunctional aliphatic cycloaliphatic oligomer epoxy resin had occurred. Titration of a portion of the adduct indicated an AHEW of 79.29. I.C.I. cone and plate viscosity was 1388 cP at 100° C.

Example 2

Curing of Hybrid Polyfunctional Aliphatic Cycloaliphatic Oligomer Epoxy Resin with Adduct of DETA and Hybrid Polyfunctional Aliphatic Cycloaliphatic Oligomer Epoxy Resin A mixture of hybrid polyfunctional cycloaliphatic oligomer epoxy resin from Reference Example 1 (8.4353 g, 0.0419 epoxide equivalent) and a portion (3.3233 g, 0.0419 amine hydrogen equivalent) of the DETA adduct of hybrid polyfunctional aliphatic cycloaliphatic oligomer epoxy resin from Example 1 were weighed (a scale with four decimal place accuracy was used) into a glass vial then vigorously stirred together to give a transparent, light yellow colored liquid. DSC analysis was completed using 9.5 mg portion of the liquid. An exothermic transition, attributable to reaction of the reactive hydrogen atoms in the adduct with the epoxide groups, was observed with an onset temperature of 37.2° C., a maximum at 111.7° C., an enthalpy of 318.8 J/g, and an end temperature of 209.5° C.

Example 3

Preparation of a Clear, Unfilled Casting of the Hybrid Polyfunctional Aliphatic Cycloaliphatic Oligomer Epoxy Resin with Adduct of DETA and Hybrid Polyfunctional Aliphatic Cycloaliphatic Oligomer Epoxy Resin for Analysis of Glass Transition Temperature The remaining portion of the curable solution from Example 2 was added to an aluminum dish (2.5 inch diameter by 0.5 inch deep) and cured in an oven using the following schedule: 1 hr at 70° C., 1 hr at 100° C., 1 hr at 125° C., and 1 hr at 150° C. The cured product was a rigid, light amber colored, transparent solid. A portion (32.6 mg) of the cured product was tested by DSC analysis using the method previously given and gave a glass transition temperature of 50.6° C. A second scanning of the cured product using the method previously given gave a glass transition temperature of 52.0° C. A third scanning of the cured product using the method previously given gave a glass transition temperature of 52.8° C.

Example 4

Curing of High Purity Diglycidyl Ether of cis-, trans-1,3- and 1,4-Cyclohexanedimethanol with Adduct of DETA and Hybrid Polyfunctional Aliphatic Cycloaliphatic Oligomer Epoxy Resin A portion (5.3901 g, 0.0418 epoxide eq) of diglycidyl ether of UNOXOL™ Diol (cis-, trans-1,3- and 1,4-cyclohexanedimethanol) obtained from the fractional vacuum distillation of the epoxy resin of UNOXOL™ Diol from a three stage synthesis was added to a glass vial. G.C. analysis of the diglycidyl ether demonstrated 99.49 wt % diglycidyl ethers, 0.16 wt % monoglycidyl ethers, 0.35 wt. % of a pair of minor peaks associated with the diglycidyl ether peak and no detectable oligomers. A portion (3.3134 g, 0.0418 amine hydrogen equivalent) of the DETA adduct of hybrid polyfunctional aliphatic cycloaliphatic oligomer epoxy resin from Example 1 was added to the glass vial then the contents were vigorously stirred together to give a slightly hazy liquid which slowly separated on standing. DSC analysis was completed using a 13.2 mg portion of the stirred, slightly hazy liquid. An exothermic transition, attributable to reaction of the reactive hydrogen atoms in the adduct with the epoxide groups, was observed with an onset temperature of 45.8° C., a maximum at 98.3° C., an enthalpy of 226.6 J/g, and an end temperature of 200.6° C.

Example 5

B-Staging of High Purity Diglycidyl Ether of cis-, trans-1,3- and 1,4-Cyclohexanedimethanol with Adduct of DETA and Hybrid Polyfunctional Aliphatic Cycloaliphatic Oligomer Epoxy Resin and Preparation of a Clear, Unfilled Casting for Analysis of Glass Transition Temperature The remaining portion of the curable mixture from Example 4 was gently heated to 50° C., transforming the slightly hazy liquid to a transparent, light yellow colored solution. This transparent, liquid state was maintained as heating ceased and the liquid began cooling. The solution was added to an aluminum dish and then placed in an oven and cured using the method of Example 3. The cured product was a rigid, light amber colored, transparent solid. A portion (34.8 mg) of the cured product was tested by DSC analysis using the method previously given and gave a glass transition temperature of 48.2° C. A second scanning of the cured product using the method previously given gave a glass transition temperature of 48.0° C.

Comparative Example A

Curing of High Purity Diglycidyl Ether of cis-, trans-1,3- and 1,4-Cyclohexanedimethanol with DETA A portion (5.0226 g, 0.03900 epoxide equivalent) of diglycidyl ether of UNOXOL™ Diol (cis-, trans-1,3- and 1,4-cyclohexanedimethanol) obtained from the fractional vacuum distillation of the epoxy resin of UNOXOL™ Diol from a three stage synthesis was added to a glass vial. G.C. analysis is given in Example 4 above. DETA (0.81 g, 0.03926 amine hydrogen equivalent) was added to the glass vial then the contents were vigorously stirred together to give a homogeneous mixture. DSC analysis was completed using a 11.4 mg portion of the solution. An exothermic transition, attributable to reaction of the reactive hydrogen atoms in the adduct with the epoxide groups, was observed with an onset temperature of 44.9° C., a maximum at 116.8° C., an enthalpy of 719.7 J/g, and an end temperature of 203.8° C.

Comparative Example B

Preparation of a Clear, Unfilled Casting of High Purity Diglycidyl Ether of cis-, trans-1,3- and 1,4-Cyclohexanedimethanol Cured with DETA and Analysis of Glass Transition Temperature The remaining portion of the curable mixture from Comparative Example A was added to an aluminum dish and then placed in an oven and cured using the method of Example 3.

The cured product was a rigid, light amber colored, transparent solid. Portions (28.5 and 32.4 mg) of the cured product were tested by DSC analysis using the method previously given (end temperature was 250° C.). The casting obtained from curing diglycidyl ether of cis-, trans-1,3- and 1,4-cyclohexanedimethanol with DETA exhibited regions of deep channels or cracks which were first observed during the initial curing at 70° C. It is possible that the very high enthalpy on curing (Comparative Example A) may be responsible for the channels propagated through the casting. Two separate samples of the casting were randomly taken and for the DSC analyses (Tables I and II). In the DSC analyses of both Samples 1 and 2, residual exothermicity was present in the first scanning and indicated incomplete cure. Upon second scanning the residual exothermicity was no longer detected in Sample 2, but was still present Sample 1 but in a reduced amount. The large enthalpy associated with this curable mixture (Comparative Example A) may be responsible for the incomplete cure, with cure occurring so energetically that the mobility of amine groups and epoxide groups in the thermosetting matrix is restricted.

TABLE I

Glass Transition Temperatures for Diglycidyl Ether of cis-, trans-1,3- and 1,4-Cyclohexanedimethanol Cured with Diethylenetriamine: Sample 1

| Tg (° C.) | Onset of Residual Exothermicity (° C.) | Peak Exotherm (° C.) | End of Residual Exothermicity (° C.) | Enthalpy (J/g) |
|---|---|---|---|---|
| 64.9 | 151.9 | 175.9 | 239.0 | 5.6 |
| 65.5 (second scanning) | 157.0 | 179.3 | 224.8 | 4.7 |

TABLE II

Glass Transition Temperatures for Diglycidyl Ether of cis-, trans-1,3- and 1,4-Cyclohexanedimethanol Cured with Diethylenetriamine: Sample 2

| Tg (° C.) | Onset of Residual Exothermicity (° C.) | Peak Exotherm (° C.) | End of Residual Exothermicity (° C.) | Enthalpy (J/g) |
|---|---|---|---|---|
| 62.9 | 155.8 | 180.6 | 241.4 | 3.6 |
| 62.4 (second scanning) | none detected | — | — | — |

Comparative Example C

Preparation and Curing of a Thermosettable Blend of the Hybrid Polyfunctional Aliphatic Cycloaliphatic Epoxy Resin and DETA A portion (10.0302 g, 0.04984 epoxide eq) of the hybrid polyfunctional aliphatic cycloaliphatic epoxy resin (distillation bottoms) from Reference Example 1 and DETA (1.0284 g, 0.04985 N—H eq) were added to a glass bottle and vigorously stirred together (a scale with four place accuracy was used for weighing). A portion (12.5 mg) of the homogeneous solution was removed for DSC analysis. An exotherm attributed to curing was observed with a 47.7° C. onset, 110.1° C. maximum, and a 206.4° C. endpoint accompanied by an enthalpy of 416.6 J/g. The cured product recovered from the DSC analysis was a transparent, light yellow colored, rigid solid.

Comparative Example D

Preparation of Clear, Unfilled Casting of a Thermosettable Blend of the Hybrid Polyfunctional Aliphatic Cycloaliphatic Epoxy Resin and DETA and Analysis of Glass Transition Temperature The remaining portion of the hybrid polyfunctional aliphatic cycloaliphatic epoxy resin (distillation bottoms) and DETA blend from Reference Example 2 was added to an aluminum dish and then placed in an oven and cured using the method of Example 3. A portion (33.9 mg) of the transparent, light yellow colored casting was removed for DSC analysis. A Tg of 51° C. was observed, with no indication of further curing or exothermic decomposition observed up to the 250° C. DSC analysis temperature. A second scanning using the aforementioned conditions again revealed a 53° C. Tg.

Reference Example 2

Re-Epoxidization of Hybrid Polyfunctional Aliphatic Cycloaliphatic Oligomer Epoxy Resin Re-epoxidation of the hybrid polyfunctional aliphatic cycloaliphatic oligomer product (Reference Example 1) was performed using two stages of aqueous sodium hydroxide addition:

A. Re-Epoxidation Reaction

A 5 L, 4 neck, glass, round bottom reactor was charged with hybrid polyfunctional aliphatic cycloaliphatic oligomer product (150.48 g), epichlorohydrin (167.2 g, 1.806 moles), toluene (602 mL) and benzyltriethylammonium chloride (6.57 g, 0.02885 mole). The reactor was additionally equipped as specified in Reference Example 1 above. The hybrid polyfunctional aliphatic cycloaliphatic oligomer product used came from Reference Example 1C. Sodium hydroxide (54.2 g, 1.355 moles) dissolved in DI water (54.2 g) for the initial addition was added to a side arm vented addition funnel, sealed with a ground glass stopper, then attached to the reactor. Stirring commenced to give a 24° C. mixture followed by commencement of dropwise addition of the aqueous sodium hydroxide solution. The reaction mixture was allowed to self-heat during the aqueous sodium hydroxide addition. Thus, after 61 min the reaction temperature first reached 25.5° C. and the addition of the aqueous sodium hydroxide was completed Immediately after completion of the aqueous sodium hydroxide addition, heating commenced to bring the reaction to 40° C. after 24 min of heating. After 20.45 hr of postreaction at 40° C., stirring ceased, and the reactor contents were allowed to settle. The organic layer was decanted from the reactor and processed as specified in Reference Example 1 with a decrease in DI water used to 250 mL.

The organic layer was reloaded into the reactor along with fresh benzyltriethylammonium chloride (6.57 g, 0.02885 mole). Sodium hydroxide (54.2 g, 1.355 moles) dissolved in DI water (54.2 g) was added to a side arm vented addition funnel, sealed with a ground glass stopper, then attached to the reactor. Stirring commenced to give a 25° C. mixture followed by commencement of dropwise addition of the aqueous sodium hydroxide solution. The reaction mixture was allowed to self-heat during the aqueous sodium hydroxide addition time. Thus, after 14 min the reaction temperature first reached 26° C. and then remained at 26° C. for the remainder of the aqueous sodium hydroxide addition. Addition of the aqueous sodium hydroxide required a total of 62 min Immediately after completion of the aqueous sodium hydroxide addition, heating commenced to bring the reaction to 40° C. after 36 min of heating. After 16.53 hr of postreaction at 40° C., stirring ceased, and the reactor contents were allowed to settle. The organic layer was decanted from the reactor and processed as specified in Reference Example 1 with a decrease in DI water used to 250 mL.

B. Epoxy Resin Product Isolation

The organic layer from the reaction was processed as specified in Reference Example 1 with a decrease in the DI water washes used to 250 mL. Rotary evaporation of the filtrate using a maximum oil bath temperature of 125° C. to a final vacuum of 4.7 mm of Hg removed the bulk of the volatiles. The product was held at 24° C. and then gravity filtered through paper. A total of 150.14 g of yellow colored, transparent liquid was recovered after completion of the filtration (note: product loss on the filter paper was not measured). After normalization to remove the peaks associated with acetonitrile solvent and the DGE of cis-, trans-1,3- and 1,4-cyclohexanedimethanol, the GC analysis demonstrated the following oligomeric components containing multiple isomers:

5.83 area % in 24.79-29.79 min retention time region, includes:
new hybrid oligomer components
and
2-propanol, 1-(oxiranylmethoxy)-3-[[3(or 4)-[(oxiranylmethoxy)methyl]cyclohexyl]methoxy]-
and
oxirane, 2-[[2-chloro-1-[[[3(or 4)-[(oxiranylmethoxy)methyl]cyclohexyl]methoxy]methyl]ethoxy]methyl]-
0.32 area % in 30.94-31.33 min retention time region:
new hybrid oligomer components
18.06 area % in 31.97-37.28 min retention time region, includes:
oxirane, 2-[[[3(or 4)-[[2,3-bis(oxiranylmethoxy)propoxy]methyl]cyclohexyl]methoxy]methyl]-
15.71 area % in 41.64-46.77 min retention time region:
new hybrid oligomer components
4.43 area % in 52.09-63.49 min retention time includes:
2-propanol, 1,3-bis[[3(or 4)-[(oxiranylmethoxy)methyl]cyclohexyl]methoxy]-
55.65 area % in 73.49-92.71 min retention time includes:
oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy]methyl]-

The aforementioned 24.79-29.79 min retention time region included 2 specific clusters of peaks with the following retention time ranges: (1) 24.79-26.39 min, (2) 27.03-29.79 min. As a reference point, the four isomeric DGEs eluted at 22.10-22.68 min Titration demonstrated an EEW of 181.11. I.C.I. cone and plate viscosity was 2885 cp.

Comparative Example E

Preparation and Curing of a Thermosettable Blend of Re-Epoxidized H-PACE Resin and Diethylenetriamine A portion (10.0151 g, 0.0553 epoxide eq) of the re-epoxidized H-PACE resin from Reference Example 2 and DETA (1.1410 g, 0.0553 N—H eq) were added to a glass bottle and vigorously stirred together (a scale with four place accuracy was used for weighing) A portion (11.3 mg) of the homogeneous solution was removed for DSC analysis. An exotherm attributed to curing was observed with a 40.8° C. onset, 121.2° C. maximum, and a 206.7° C. endpoint accompanied by an enthalpy of 500.5 J/g. The cured product recovered from the DSC analysis was a transparent, light yellow colored, rigid solid.

Comparative Example F

Preparation of Clear, Unfilled Casting of a Thermosettable Blend of the Re-Epoxidized H-PACE Resin and Diethylenetriamine and Analysis of Glass Transition Temperature The remaining portion of the re-epoxidized H-PACE resin and DETA blend from Reference Example 2 was added to an aluminum dish and then placed in an oven and cured using the method of Example 3. A portion (32.1 mg) of the transparent, light yellow colored casting was removed for DSC analysis. A Tg of 64° C. was observed, with no indication of further curing or exothermic decomposition observed up to the 250° C. DSC analysis temperature. Second and third scannings using the aforementioned conditions again both revealed a 64° C. Tg.

Example 6

Preparation and Characterization of an Adduct of DETA and Re-Epoxidized Hybrid Polyfunctional Aliphatic Cycloaliphatic Oligomer Epoxy Resin A 1 L 3 neck, glass, round bottom, reactor was charged under nitrogen with DETA (412.7 g, 4.0 moles, 20 amine hydrogen eq). The DETA used was a commercial grade product obtained from Sigma-Aldrich Chemical Company with a purity specification of 99%. The reactor was additionally equipped with a condenser (maintained at 24° C.), a thermometer, a Claisen adaptor, an overhead nitrogen inlet (1 LPM $N_2$ used), and magnetic stirring. A portion (36.22 g, 0.20 epoxide eq) of re-epoxidized hybrid polyfunctional aliphatic cycloaliphatic oligomer epoxy resin from Reference Example 2 above was added to a side arm vented addition funnel, then attached to the reactor. Stirring and heating using a thermostatically controlled heating mantle commenced to give a 40° C. solution. Dropwise addition of the hybrid polyfunctional aliphatic cycloaliphatic oligomer epoxy resin commenced while maintaining the reaction temperature at 40° C. After 2.92 hr, the dropwise addition was completed. The resultant light yellow colored solution was stirred and maintained at 40° C. for the next 44 hr followed by rotary evaporation at 75° C. to remove the bulk of the excess DETA. Additional rotary evaporation was completed using a maximum 140° C. oil bath temperatures to a vacuum of 0.28 mm Hg. A transparent, light yellow colored, liquid adduct product was recovered from the rotary evaporation (56.02 g). GC analysis of an aliquot of the adduct product revealed that complete reaction of all polyfunctional aliphatic cycloaliphatic oligomer epoxy resin had occurred. Titration of a portion of the adduct indicated an AHEW of 77.63. I.C.I. cone and plate viscosity was 1460 cP at 100° C.

Example 7

Curing of Re-Epoxidized Hybrid Polyfunctional Aliphatic Cycloaliphatic Oligomer Epoxy Resin with Adduct of DETA and Re-Epoxidized Hybrid Polyfunctional Aliphatic Cycloaliphatic Oligomer Epoxy Resin A mixture of re-epoxidized hybrid polyfunctional cycloaliphatic oligomer epoxy resin from Reference Example 2 (8.1835 g, 0.0452 epoxide equivalent) and a portion (3.5077 g, 0.0452 amine hydrogen equivalent) of the DETA adduct of re-epoxidized hybrid polyfunctional aliphatic cycloaliphatic oligomer epoxy resin from Example 6 were weighed (a scale with four decimal place accuracy was used) into a glass vial then vigorously stirred together to give a transparent, light yellow colored liquid. DSC analysis was completed using 8.0 mg portion of the liquid. An exothermic transition, attributable to reaction of the reactive hydrogen atoms in the adduct with the epoxide groups, was observed with an onset temperature of 51.8° C., a maximum at 115.3° C., an enthalpy of 173.8 J/g, and an end temperature of 196.2° C.

Example 8

Preparation of a Clear, Unfilled Casting of the Re-Epoxidized Hybrid Polyfunctional Aliphatic Cycloaliphatic Oligomer Epoxy Resin with Adduct of DETA and Re-Epoxidized Hybrid Polyfunctional Aliphatic Cycloaliphatic Oligomer Epoxy Resin for Analysis of Glass Transition Temperature The remaining portion of the curable solution from Example 7 was added to an aluminum dish (2.5 inch diameter by 0.5 inch deep) and then placed in an oven and cured using the method of Example 3. The cured product was a rigid, light amber colored, transparent solid. A portion (36.6 mg) of the cured product was tested by DSC analysis using the method previously given and gave a glass transition temperature of 63.4° C. A second scanning of the cured product using the method previously given gave a glass transition temperature of 64.4° C. Third and fourth scannings were completed but using an end temperature of 300° C. and gave glass transition temperatures of 62.8° C. and 64.0° C., respectively. Exothermic upshifts commencing at 262.1° C. and 260.1° C. were additionally noted in the third and fourth scans, respectively.

What is claimed is:

1. A hybrid epoxy resin adduct comprising the reaction product of:
    (A) a material selected from the group consisting of a hybrid polyfunctional aliphatic epoxy resin,a hybrid cycloaliphatic epoxy resin, and combinations thereof; wherein (A) is formed by contacting:
    (a) a hydroxyl-containing material selected from the group consisting of an aliphatic hydroxyl-containing material, a cycloaliphatic hydroxyl-containing material, and combinations thereof;
    (b) a material selected from the group consisting of a monoglycidyl ether-containing material, a diglycidyl ether-containing material, and combinations thereof wherein (b) is prepared from a different precursor than (a);
    (c) an epihalohydrin;
    (d) a basic acting substance;
    (e) a non-Lewis acid catalyst; and
    (f) optionally, a solvent
    and
    (B) at least one epoxide reactive compound comprising one or more compounds having two or more epoxide-reactive hydrogen atoms per molecule.

2. The hybrid epoxy resin adduct of claim 1, wherein component (a) is selected from the group consisting of cis-, trans-1,3- and 1,4-cyclohexanedimethanol; cis-, trans-1,4-cyclohexanedimethanol; cis-, trans-1,3-cyclohexanedimethanol; 1,1-cyclohexanedimethanol and combinations thereof.

3. The hybrid epoxy resin adduct of claim 1, wherein (B) comprises an alkyleneamine or polyalkylenepolyamine, a di- or polyamine, or a primary monoamine.

4. The hybrid epoxy resin adduct of claim 1, further comprising:
    (C) an epoxy resin compound different from compound (A).

5. The hybrid epoxy resin adduct of claim 4, wherein the epoxy resin compound (C) comprises an epoxy resin selected from the group consisting of an aliphatic epoxy resin,a cycloaliphatic epoxy resin , and combinations thereof.

6. The hybrid epoxy resin adduct of claim 1, wherein compound (A) comprises the re-epoxidation product of a hybrid epoxy resin selected from the group consisting of a re-epoxidized hybrid polyfunctional aliphatic epoxy resin,a re-epoxidized hybrid polyfunctional cycloaliphatic epoxy resin, and combinations thereof.

7. A process for preparing a hybrid epoxy resin adduct comprising reacting:
    (A) a compound selected from the group consisting of a hybrid polyfunctional aliphatic epoxy resin, a hybrid polyfunctional cycloaliphatic epoxy resin, and combinations thereof wherein (A) is formed by contacting
    (a) a hydroxyl-containing material selected from the group consisting of an aliphatic hydroxyl-containing material, a cycloaliphatic hydroxyl-containing material, and combinations thereof;
    (b) a material selected from the group consisting of a monoglycidyl ether-containing material, a diglycidyl ether-containing material, and combinations thereof;
    (c) an epihalohydrin,
    (d) a basic acting substance,
    (e) a non-Lewis acid catalyst, and
    (f) optionally, a solvent,
    wherein (b) is prepared from a different precursor than (a) and
    (B) at least one reactive compound comprising one or more compounds having two or more epoxide-reactive hydrogen atoms per molecule.

8. A curable epoxy resin composition comprising (I) the hybrid epoxy resin adduct of claim 1 and (II) at least one epoxy resin compound.

9. The curable epoxy resin composition of claim 8, wherein the at least one epoxy resin compound (II) is selected from the group consisting of
    (i) an epoxy resin selected from the group consisting of a hybrid oligomeric polyfunctional aliphatic epoxy resin, a hybrid oligomeric cycloaliphatic epoxy resin, and combinations thereof,
    (ii) an epoxy resin compound different from (i), and
    (iii) combinations thereof.

10. The curable epoxy resin composition of claim 8, wherein the at least one epoxy resin compound (II) is selected from the group consisting of a diglycidyl ether of cis-, trans-1,3- and 1,4-cyclohexanedimethanol, cis-, trans- 1,4-cyclohexanedimethanol; cis-, trans-1,3- cyclohexanedimethanol, 1,1-cyclohexanedimethanol and combinations thereof.

11. A process for preparing a curable epoxy resin composition comprising admixing (I) the hybrid epoxy resin adduct of claim 1; and (II) at least one epoxy resin compound to form an admixture.

12. The process of claim 11, wherein the admixture has a temperature in the range of from about 0 ° C. to about 300 ° C.

13. A B-staged thermoset product comprising the partially cured epoxy resin composition of claim 8.

14. A process of B-staging an epoxy resin composition comprising partially curing the epoxy resin composition of claim 8.

15. A cured thermoset product comprising the totally cured epoxy resin composition of claim 8.

16. A process of curing an epoxy resin composition comprising completely curing the epoxy resin composition of claim 8.

17. An article made from the composition of claim 1.

18. An article made from the composition of claim 7.

19. An article made from the composition of claim 8.

* * * * *